(12) United States Patent
Van Wie et al.

(10) Patent No.: US 10,560,306 B2
(45) Date of Patent: Feb. 11, 2020

(54) PERVASIVE REALTIME FRAMEWORK

(71) Applicant: Sococo, Inc., Boston, MA (US)

(72) Inventors: David Van Wie, Eugene, OR (US);
Joseph Altmaier, North Liberty, IA (US)

(73) Assignee: Sococo, Inc., Boston, MA (US)

(*) Notice: Subject to any disclaimer, the term of this patent is extended or adjusted under 35 U.S.C. 154(b) by 15 days.

(21) Appl. No.: 16/032,892

(22) Filed: Jul. 11, 2018

(65) Prior Publication Data

US 2018/0324025 A1 Nov. 8, 2018

Related U.S. Application Data

(63) Continuation of application No. 14/519,067, filed on Oct. 20, 2014, now Pat. No. 10,027,528, which is a continuation of application No. 12/631,008, filed on Dec. 4, 2009, now Pat. No. 8,868,656.

(60) Provisional application No. 61/120,379, filed on Dec. 5, 2008.

(51) Int. Cl.
*G06F 15/16* (2006.01)
*H04L 12/24* (2006.01)
*G06F 9/451* (2018.01)
*H04L 29/06* (2006.01)

(52) U.S. Cl.
CPC .............. *H04L 41/02* (2013.01); *G06F 9/451* (2018.02); *H04L 65/1073* (2013.01); *H04L 65/4015* (2013.01); *H04L 67/38* (2013.01)

(58) Field of Classification Search
CPC . H04L 41/02; H04L 65/1073; H04L 65/4015; H04L 67/38; G06F 9/451
USPC ......................................................... 709/232
See application file for complete search history.

(56) References Cited

U.S. PATENT DOCUMENTS

2004/0148347 A1* 7/2004 Appelman ........ H04L 29/08684
709/204

* cited by examiner

*Primary Examiner* — Wing F Chan
*Assistant Examiner* — Joseph R Maniwang

(57) ABSTRACT

A pervasive realtime framework supports the execution of realtime software applications with high-level functions that significantly reduce the effort and time needed to develop realtime software applications in a new operating environment paradigm in which realtime connections between network nodes are pervasive. The pervasive realtime framework handles the complex tasks of connecting to communicants, virtual areas, and other network resources, as well as switching those connections in response to user inputs and thereby enables software application developers to focus on developing high-level realtime software application functionality.

20 Claims, 15 Drawing Sheets

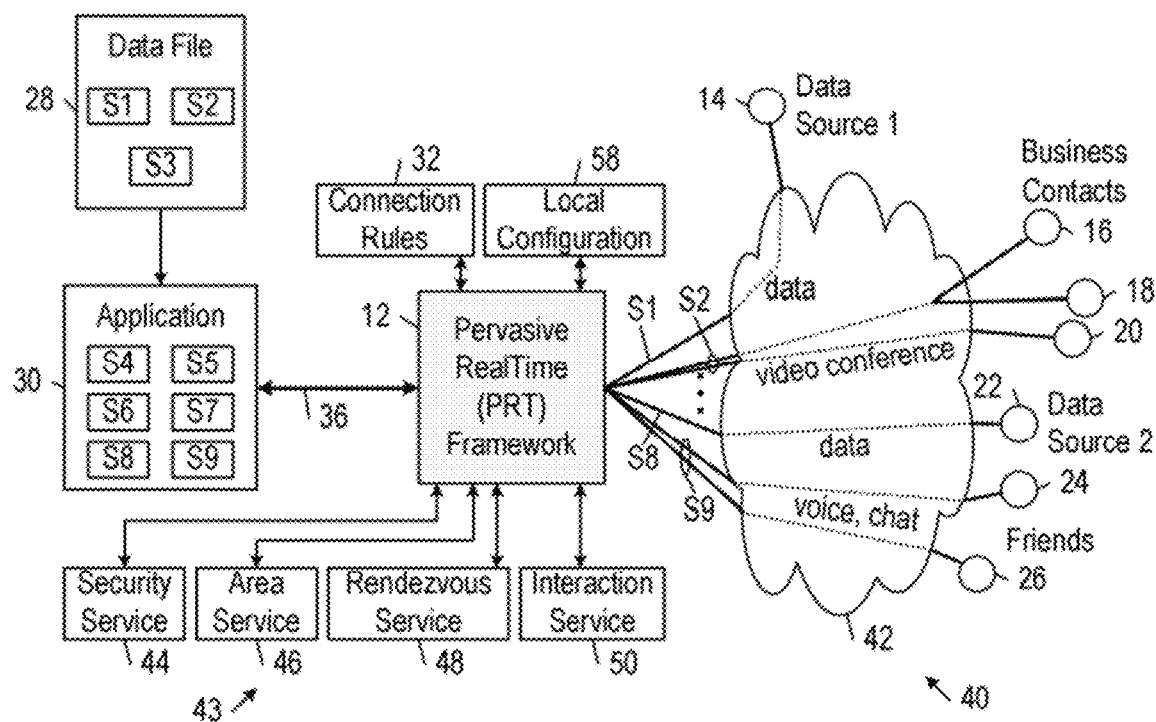

FIG. 1

Publish An Application Programming Interface (API) Declaring Functions That Perform Operations Including Administering Network Connections Of Realtime Data Streams Based On Connection Rules Each Of Which Includes At Least One Of A Respective Designation Of A Virtual Area And A Respective Designation Of One Or More Connection Targets That Are Associated With The Virtual Area — 34

In Response To An Invocation Of The API, Administer A Realtime Data Stream Connection With At Least One Network Node Based On A Respective One Of The Connection Rules Associated With At Least One Of A Computer Software Application And A Computer Data File And At Least One Position In The Virtual Area — 38

FIG. 2

| Section Definition Database | | | |
|---|---|---|---|
| Record ID | Data File ID | Section | Data File Component |
| 1 | ID1 | S1 | B(1) |
| 2 | ID1 | S2 | C |
| 3 | ID1 | S3 | B(3), C |

| Section Definition Database | | | |
|---|---|---|---|
| Record ID | Application ID | Section | Application Component |
| 1 | ID2 | S4 | E |
| 2 | ID2 | S5 | F |
| 3 | ID2 | S6 | F(1) |
| 4 | ID2 | S7 | F(2) |
| 5 | ID2 | S8 | F(ii), F(iii) |
| 6 | ID2 | S9 | E(3), F(i) |

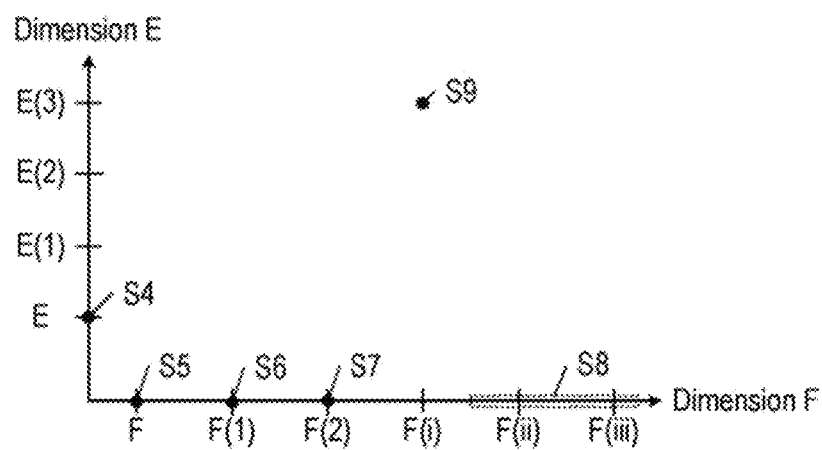
FIG. 7A
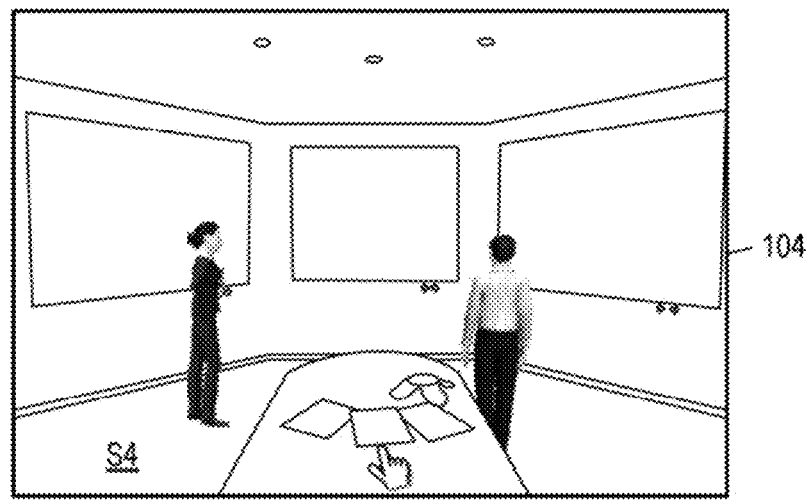
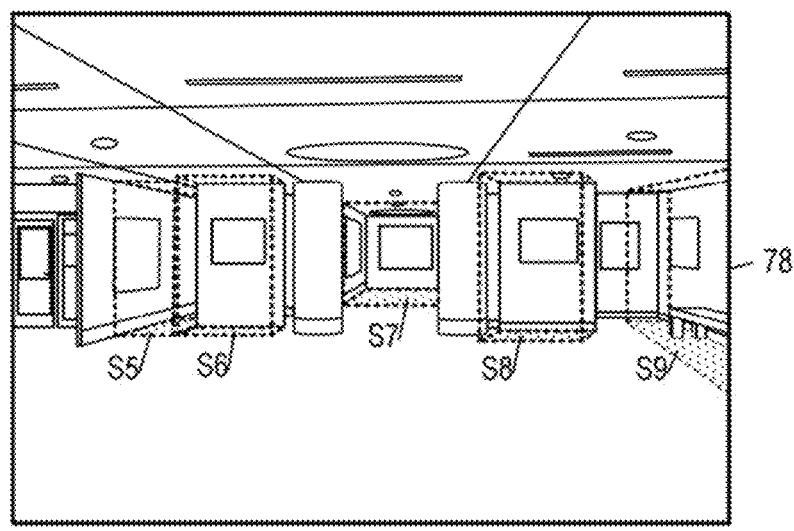
FIG. 7B

PERVASIVE REALTIME FRAMEWORK

CROSS-REFERENCE TO RELATED APPLICATIONS

This application is a continuation of prior U.S. patent application Ser. No. 14/519,067, filed Oct. 20, 2014, which is a continuation of prior U.S. patent application Ser. No. 12/631,008, filed Dec. 4, 2009, and claims the benefit of U.S. Provisional Application No. 61/120,379, filed Dec. 5, 2008. The entirety of each of prior U.S. patent application Ser. No. 14/519,067, filed Oct. 20, 2014, and prior U.S. patent application Ser. No. 12/631,008, filed Dec. 4, 2009, is incorporated herein by reference.

This application relates to the following co-pending patent applications, the entirety of each of which is incorporated herein by reference:

U.S. patent application Ser. No. 12/418,243, filed Apr. 3, 2009;

U.S. patent application Ser. No. 11/923,629, filed Oct. 24, 2007; and

U.S. patent application Ser. No. 11/923,634, filed Oct. 24, 2007.

BACKGROUND OF THE INVENTION

Advances in high-speed networks and computer processing resources have resulted in the proliferation of a wide variety of different realtime software applications, including realtime communications systems (e.g., text chat, voice, and video communication systems) and realtime data streaming systems that require fast response, times (e.g., online financial trading systems). A realtime software application operates on a computer in an application environment created by a computer operating system. The computer operating system typically provides a standardized, consistent application programming interface (API) between the realtime software application program and the computer system hardware. The API typically allows the realtime software application to interlace with or access the computer system hardware in a standardized manner through a set of low-level primitives. The low-level primitives must be integrated by low-level plumbing code into higher-level functionality that supports the realtime functionality required by realtime software applications. The minimal development support provided by a computer operating system imposes a considerable burden on the developers of realtime software applications: not only is significant effort needed to write the underlying plumbing code, but also the intrinsic complexity of wiring code that interacts directly with low-level primitives inevitably increases the time needed to develop realtime software applications.

BRIEF SUMMARY OF THE INVENTION

In one aspect, the invention features a method in accordance with which an instance of a virtual area is determined based on a designation of the virtual area in a connection rule associated with at least one of a software application and a computer data file. One or more network nodes that are associated with the instance of the virtual area are ascertained. Transfer of at least one realtime data stream is initiated over at least one network connection with at least one of the network nodes in a context defined by the instance of the virtual area.

In another aspect, the invention features a method in accordance with which a designation of at least one connection target in a connection rule is resolved to at least one respective network node connection handle, where the connection rule is associated with at least one of a software application and a computer data file. Transfer of at least one realtime data stream is initiated over at least one network connection with at least one network node respectively associated with the at least one respective network node connection handle.

In another aspect, the invention features a method in accordance with which an application programming interface (API) is published. The API declares functions that perform operations comprising administering network connections of realtime data streams based on connection rules. Each of the connection rules includes at least one of a respective designation of a virtual area and a respective designation of one or more connection targets that are associated with the virtual area. In response to an invocation of the API, a realtime data stream connection with at least one network node is administered based on a respective one of the connection roles that is associated with at least one of a software application and a computer data file and at least one position in the virtual area.

In another aspect, the invention features a method in accordance with which an application programming interface (API) is invoked with a call that establishes a network connection with at least one connection target in a context defined by an instance of a virtual area based on a connection rule that is associated with at least one of a software application and a data file on which the software application is operable. The connection rule includes a respective designation of the virtual area and a respective designation of one or more connection targets associated with the virtual area. The API is invoked with a call that initiates transfer of at least one realtime data stream with the connection target over the network connection based on position in the virtual area instance.

In another aspect, the invention features a method in accordance with which at least the following operations are performed in response to an application programming interface (API) call that includes a definition of position in at least one of a software application and a computer data file: determining a connection rule that is associated with the position definition and includes a designation of a virtual area; establishing a session with a network infrastructure service that hosts an instance of the virtual area and publishes state data describing a current state of the virtual area instance; subscribing to the state data; and rendering a human-perceptible view of the state data.

In one aspect, the invention features a method in accordance with which at least the following operations are performed in response to an application programming interface (API) call that includes a definition of position in at least one of a software application and a computer data file: determining a connection rule that is associated with the position definition and includes a designation of at least one connection target; establishing a session with a network infrastructure service that manages distribution of connection handles for network nodes; declaring to the network infrastructure service an intention to connect to one or more of the connection targets designated in the connection object; receiving from the network infrastructure service at least one respective network node connection handle; and initiating transfer of at least one realtime data stream over at least one network connection with a network node that is associated with the at least one respective network node connection handle.

In one aspect, the invention features a method in accordance with which at least the following operations are performed in response to an application programming interface (API) call that includes a definition of position in at least one of a software application and a computer data file: determining a connection rule that is associated with the position definition and includes a designation of at least one connection target: establishing a session with a network infrastructure service that manages exchange of presence data between network nodes; and declaring to the network infrastructure service an intention to export presence data that includes the definition of position to at least one of the network nodes respectively corresponding to the at least one connection target.

The invention also features apparatus operable to implement the inventive methods described above and computer-readable media storing computer-readable instructions causing a computer to implement the inventive methods described above.

Other features and advantages of the invention will become apparent from the following description, including the drawings and the claims.

BRIEF DESCRIPTION OF THE DRAWINGS

FIG. 1 is a diagrammatic view of an embodiment of an operating environment that include pervasive realtime framework and a network infrastructure service environment.

FIG. 2 is a flow diagram of an embodiment of a method that is performed by an embodiment of the pervasive realtime framework of FIG. 1.

FIG. 7A is a diagrammatic view of an embodiment of an abstract virtual space that has zones which are mapped to sections of the software application of FIG. 6A.

FIG. 7B is a diagrammatic view of embodiments of two visual virtual spaces that have zones which are mapped to sections of the software application of FIG. 6A.

DETAILED DESCRIPTION OF THE INVENTION

Figure 3:
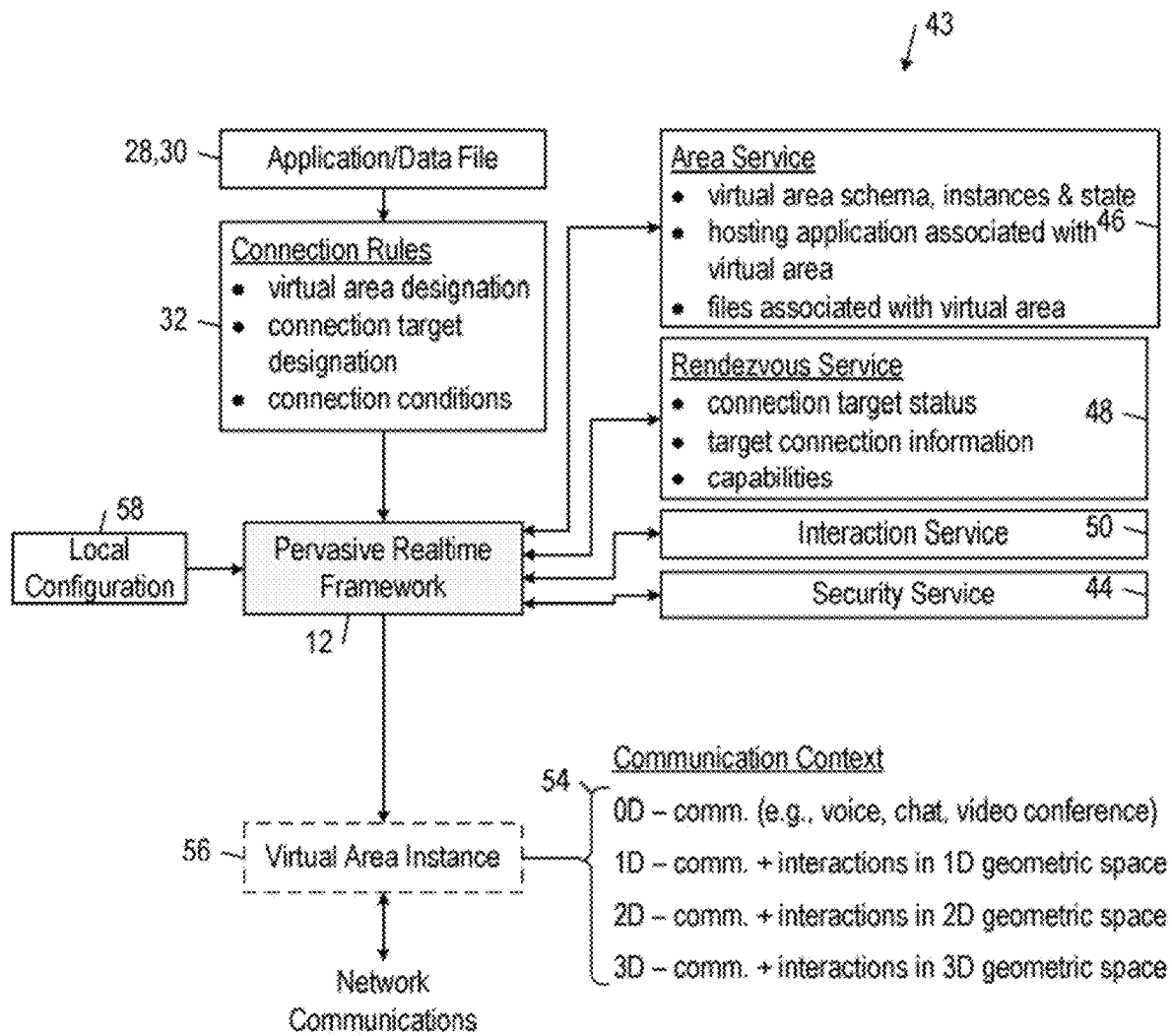
FIG. 3 is a block diagram of an embodiment of the pervasive realtime framework and the network infrastructure service environment of FIG. 1 establishing realtime communications in a communication context defined by a virtual area instance.

In the following description, like reference numbers are used to identify like elements. Furthermore, the drawings are intended to illustrate major features of exemplary embodiments in a diagrammatic manner. The drawings are not intended to depict every feature of actual embodiments nor relative-dimensions of the depicted elements, and are not drawn to scale.

I. Definition of Terms

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application computer software a computer application, a program, and a computer program) is a set of instructions that a computer can interpret and execute to perform one or more specific tasks. An "application programming interface" (or API) is a set of declarations of the functions (or procedures) that an operating system, library, or service provides to support requests made by a software application. An API specifies an interface and the behavior of the identifiers specified in that interface. An implementation of an API refers to the software application code that provides the functionality described by the API. A "computer data file" is a block of information that durably stores data for use by a software application.

An "interaction space" is an abstract space that has a dimension for each of at least one of a software application and a computer data file and has "positions" that correspond to different sections of the software application and/or data file (e.g., chapters or presentation slides in a computer data file, and different functions or entry points of a software application). The "current focus of a user with respect to the interaction space" is the section of the software application and/or computer data file that currently is active on the user's network node.

A "database" is an organized collection of records that are presented in a standardized format that can be searched by computers. A database may be stored on a single computer-readable data storage medium or it may be distributed across multiple computer-readable data storage media.

A "data sink" (referred to herein simply as a "sink") is any of a device, part of a device (e.g., a computer), or software that receives data.

A "data source" (referred to herein simply as a "source") is any of a device, part of a device (e.g., a computer), or software that originates data.

A "framework" is a set of reusable cooperating classes of high-level functions and a protocol that governs the ways in which low-level functions (e.g., operating system primitives and kernel primitives) can be combined, including rules that define how the primitives can be called by a software application and how the framework responds to such calls.

A "network node" is a junction or connection point in a communications network. Exemplary network nodes include, but not limited to, a terminal, a computer, and a network switch. A "network connection" is a link between two communicating network nodes.

A "connection rule" designates at least one of a virtual area and a connection target, and includes an optional set of one or more connection conditions that guides the behavior of a suitably configured software application or service in initiating network connections. A "connection target" refers to an identifier or connection handle (e.g., a uniform resource identifier (URI)) that can be used to establish a network connection with a communicant, resource, or service on a network node. A "connection condition" specifies one or more parameters that influence the establishing of a network connection, the managing of a network connection, or the processing of data transferred across a network connection. For example, a connection condition may describe a predicate on the operating environment that should be satisfied before a network connection is attempted or established.

An "object" is any type of discrete element in a virtual area that may be usefully treated separately from the geometry of the virtual area. Exemplary objects include doors, portals, windows, view screens, and speakerphone. An object typically has attributes or properties that are separate and distinct from the attributes and properties of the virtual area. An "avatar" is an object that represents a communicant in a virtual area.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to he received with no delay or only imperceptible delay. Realtime data streams may fall into different priority categories ranging from higher priority, hard realtime data streams (e.g., voice streams) to lower priority, soft realtime data streams (e.g., screen sharing data streams). Realtime data streams include digital representations of voice, video, user movements, facial expressions and other physical phenomena as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), and file transfers.

A "stream mix" is a combination of two or more realtime data streams of the same or semantically consistent type (e.g., audio, video, chat, and motion data). For example, a set of voice streams might be mixed into a single voice stream or a voice stream might be mixed into the audio portion of a video stream.

" switching rule" is an instruction that specifies a connection or disconnection of one or more realtime data sources arid one or more realtime data sinks subject to one or more conditions precedent.

"virtual area" (also referred to as an "area" or a "place") is a representation of a computer-managed space or scene. Virtual areas typically are one-dimensional, two-dimensional or three-dimensional representations: although in some embodiments a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules. A virtual area typically refers to an instance of a virtual area schema, where the schema defines the structure and contents of a virtual area in terms of variables and the instance defines the structure and contents of a virtual area in terms of values that have been resolved from a particular context.

A "virtual area specification" is a virtual area description that is used in creating a shared virtual area communication environment.

A "virtual communication environment" is a representation of a computer-managed space that includes at least one virtual area and supports realtime communications between communicants.

A "zone" is a region of a virtual area that is associated with at least one switching rule or governance rule. A switching rule controls the switching (e.g., routing, connecting and disconnecting) realtime data streams between network nodes communicating, through a shared virtual area. A governance rule controls a communicant's access to a resource (e.g., an area, a region of an area, or the contents of that area or region), the scope of that access, and follow-on consequences of that access (e.g., the requirement that audit records relating to that access must be recorded).

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "communicant" is a person who communicates or otherwise interacts with other persons over a network connection, where the communication or interaction may or may not occur in the context of a shared virtual area. A "user" is a communicant who is operating a particular network node that defines a particular perspective for descriptive purposes.

A "predicate" is a conditional part of a rule.

As used herein, the term "includes" means includes but not limited to, and the term "including" means including but not limited to.

II. Introduction

The embodiments that are described herein provide a pervasive mealtime framework that supports the execution of realtime software applications with high-level functions that significantly reduce the effort and time needed to develop realtime software applications in a new operating environment paradigm in which mealtime connections between network nodes are pervasive. The pervasive realtime framework handles the complex tasks of connecting to communicants, virtual areas, and other network resources as well as switching those connections in response to user inputs and thereby enables software application developers to focus on developing high-level realtime software application functionality.

In some embodiments, the pervasive realtime framework provides functions that integrate traditional operating system functions (e.g., process management functions, file management functions, memory management functions, storage management function, device management functions, and network management functions) with realtime functions (e.g., realtime scheduling functions, realtime connection functions, and realtime data stream handling functions).

In some embodiments, the pervasive realtime framework includes a library of pre-coded solutions to common pervasive realtime tasks, a kernel that supports the execution of those tasks, and tools for configuring and building applications that can leverage the functions provided by the framework. In this way, the pervasive realtime framework brings a set of realtime high-level functions and primitives into peer relationship with traditional operating system primitives.

Some embodiments of the pervasive realtime framework enable software application designers to define the semantics of position in a software application or a computer data file and to associate those position semantics with at least one of a virtual area and a connection target. These embodiments include functions that can be invoked by software applications to use position as a switching metaphor in a spatial network connection system. These Features allow position in a software application or a computer data file to be used, for example, to chive connections to virtual areas entries into virtual areas, connections to communicants and other sources or sinks of realtime data streams, and determinations of presence data relating to communicants and network resources and services.

III. Overview

A. A Pervasive Realtime (PRT) Framework

FIG. 1 shows an embodiment of a pervasive realtime (PRT) framework 12 that administers network connections with a variety of different network nodes 14, 16, 18, 20, 22, 24, 26 based on position in at least one of a computer data file 28 and a software application 30 and based on one or more connection rules 32 that are associated with at least one of the software application 28 and the computer data file. Each of the connection rules 32 designates at least one of a virtual area and a connection target, and includes an optional set of one or more connection conditions that guides the behavior of a suitably configured software application or service in administering network connections.

FIG. 2 shows an exemplary embodiment of a method that is implemented by the PRT framework 12. In accordance with this method, the PRT framework 12 publishes an application programming interface (API) that declares functions that perform operations that include administering network connections of realtime data streams based on the connection rules 32 (FIG. 2, block 34). Each of the connection rules 32 includes at least one of a respective designation of a virtual area and a respective designation of one or more connection targets that are associated with the virtual area. In response to an invocation 36 of the API, the PRT framework 12 administers a realtime data stream connection with at least one network node based on a respective one of the connection rules 32 that is associated with at least one of the software application 30 and the computer data file 28 and at least one position in the virtual area (FIG. 2, block 38).

In the exemplary embodiment shown in FIG. 1, the computer data file 28 contains three sections (S1, S2, S3) each of which is defined as a respective position in the computer data file 28 (e.g., a respective paragraph or chapter in a word processing document); the software application 30 contains six sections (S4, S5, S6, S7, S8, S9) each of which is defined as a respective position in the software application 30 (e.g., a respective function or entry point of the software application). Each of the sections (S1-S3) of the computer data file 28 and each of the sections (S4-S9) of the software application 30 is associated with at least one of the connection rules 32. In this way the PRT framework 12 can connect each of the sections S1-S9 either to a virtual area or one or more connection targets, or both, in a realtime way, including exporting presence information to the associated connection targets, inviting the associated connection targets to participate in a communication session in the associated virtual area, and establishing mealtime connections with the associated connection targets.

In implementing the method of FIG. 2 with respect to the embodiment shown in FIG. 1, for example, the PRT framework 12 administers a respective realtime data stream connection with one or more of the network nodes 14-26 based on the reported position in that least one of the computer data file 28 and the software application 30, and based on the connection rule that is associated with the reported position. When the reported position is S1, the PRT framework 12 administers a realtime data stream network connection with network node 14 (Data Source 1; e.g., a realtime stock quoting service) in accordance with the connection rule associated with the position S1. When the reported position is S2, the PRT framework 12 administers a video conference network connection with network nodes 16, 18, and 20 (Business Contacts) in accordance with the connection rule associated with the position S2. When the reported position is S8, the PRT framework 12 administers a realtime data stream connection with network node 22 (Data Source 2; e.g., a realtime music or video streaming service) in accordance with the connection rule associated with the position S8. When the reported position is S9, the PRT framework 12 administers voice and text chat network connections with network nodes 24. 26 (friends) in accordance with the connection rule associated with the position S9.

Thus, the PRT framework 12 enables software application developers to build software applications that can operate in a pervasive realtime connection environment through the association of connection rules with software applications, computer data files, and parts thereof. The PRT framework 12 administers the realtime connections and realtime data stream processing as required by the connection rules and thereby allows software application developers to focus on the value-added task of generating software applications that can leverage this new paradigm of pervasive network connections.

B. Operating Environment

As shown in FIGS. 1 and 3, the PRT framework 12 operates in the context of an operating environment 40 that includes a network 42 and a network infrastructure service environment 43.

1. Network Environment

The network 42 may include any of a local area network (LAN), a metropolitan area network (MAN), and a wide area network (WAN) (e.g., the internet). The network 42 typically includes a number of different computing platforms and transport facities that support the transmission of a wide variety of different media types (e.g., text, voice, audio, and video) between network nodes.

The PRT framework 12 typically operates on a network node that includes software and hardware resources which—together with administrative policies, user preferences (including preferences regarding the exportation of the user's presence and the: connection of the user to areas and connection targets), and other settings—define a local configuration S8 that influences the administration of realtime connections with other network nodes. The network connections between network nodes may be arranged in a variety of different stream handling topologies including a peer-to-peer architecture a server-mediated architecture, and hybrid architectures that combine aspects of peer-to-peer and server-mediated architectures. Exemplary topologies of these types are described in U.S. application Ser. Nos. 11/923,629 and 11/923,634, both of which were filed on Oct. 24. 2007.

2. Infrastructure Service Environment

The network infrastructure service environment 43 provides one or more network infrastructure services that cooperate with the PRT framework 12 in the administration of the network connections with the network nodes 14-26. The network infrastructure services may run on a single network node or may be distributed across multiple network nodes. The network infrastructure services typically run on one or more dedicate network nodes (e.g., a server computer or a network device that performs edge services, such as routing and switching). In some embodiments, however, one or more of the network infrastructure services run on at least one of the communicants' network nodes. In some embodiments, one or more of the network infrastructure services run on, one or more virtual machines, which may be running on the same physical hardware. Among the network infrastructure services that are included in the exemplary operating environment 40 are a security service 44, an area service 46, a rendezvous service 48, and an interaction service 50.

The security service 44 controls communicants' access to the resources of the operating environment 40. The access control method that is implemented by the security service 44 typically is based on either capabilities (where access is granted to entities having proper capabilities or permissions) or an access control list (where access is granted to entities having identities that are on the list). After the security service 44 has granted access to a particular communicant, that communicant typically uses the functionality provided by the other network infrastructure services to interact in the operating environment 40.

The area service 46 hosts a virtual area. In this process, the area service 46 manages connections to the virtual area subject to the capabilities of the requesting entities, maintains global state information for the virtual area, and serves as a data server for the network nodes participating in a shared communication session in a context defined by the virtual area. The global state information includes a list of all the objects that are in the virtual area and their respective locations in the virtual area. The area service 46 periodically sends the global state information to the participating network nodes. The area service 46 also registers and transmits initialization information to other network nodes that request to join the communication session. In this process, the area service 46 transmits to each joining network node a copy of a virtual area specification, which may be stored in a local or remote database. The area service 46 also ensures that the participating network nodes can synchronize to a global state if a communications fault occurs.

The rendezvous service 48 manages the collection, storage, and distribution of presence information and provides mechanisms for network nodes to communicate with one another (e.g., by managing the distribution of connection handles) subject to the capabilities of the requesting entities. The rendezvous service 48 typically stores the presence information in a presence database.

The interaction service 50 maintains an interaction database that records interactions between communicants and supports queries on the interaction database subject to the capabilities of the requesting entities. For every interaction of between communicants, one or more services in the operating environment 43 (e.g., the area service 46) transmit interaction data to the interaction service 50. In response, the interaction service 50 generates one or more respective interaction records in the relationship database. Each interaction record describes the context of an interaction. For example, in sonic embodiments, an interaction record contains an identifier for each of the communicants, an identifier for the place of interaction (e.g., a virtual area instance), a description of the hierarchy of We interaction place (e.g., a description of how the interaction room relates to a larger area), start and end times of the interaction, and a list of all files and other streams shared during the interaction. Thus, for each realtime interaction, the interaction service 50 tracks when it occurred, where it occurred, and what happens during the interaction in terms of communicants involved (e.g., entering and exiting), objects that are activated/deactivated, and the files that were shared.

The interaction service 50 is able to present the results of queries on the interaction database records in a sorted order (e.g., most frequent or most recent) based on place. The query results can be used to drive a frequency sort of who a communicant has met in which virtual areas, as well as sorts of who the communicant has met with regardless of virtual area and sorts of the virtual areas the communicant frequents most often. The query results also may be used by software application developers as part of a heuristic system that automates certain tasks based on relationships. An example of a heuristic of this type is a heuristic that permits communicants who have visited a particular virtual area more than five times to enter without knocking by default, or a heuristic that allows communicants who were present in an area at a particular time to modify and delete files created by another communicant who was present in the same area at the same time. Queries on the interaction database can be combined with other searches. For example, queries on the interaction database may be combined with queries on contact history data generated for interactions with contacts using a communication system (e.g., Skype, Facebook, and flickr) outside the domain of the network infrastructure service environment 43.

3. Virtual Areas

Referring to FIG. 3, in some embodiments the PRT framework 12 administers the realtime connections with network nodes in a communication context 54 that is defined by an instance 56 of a virtual area. The virtual area instance 56 may correspond to an abstract virtual space that is defined with respect to abstract coordinates (e.g., coordinates that are defined by positions in the associated computer data file r software application, or in an embodiment in which a customer service database is an area, each record in the database constitutes a zone). Alternatively, the virtual area instance 56 may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

Communicants typically access the virtual area instance 56 from respective network nodes that execute respective computing environments that that can determine movements in the virtual area and establish realtime data stream connections with other network nodes. The communicants typically are represented by respective avatars in a virtual area that has an associated visualization. The avatars move about the virtual area in response to input commands that are input by the communicants at their respective network nodes. The communicant's view of a virtual area instance that has an associated visualization typically is presented from the perspective of the communicant's avatar, and each communicant typically is able to vies, any part of the visual virtual area around his or her avatar, increasing the level of immersion that is experienced by the communicant.

Figure 4:
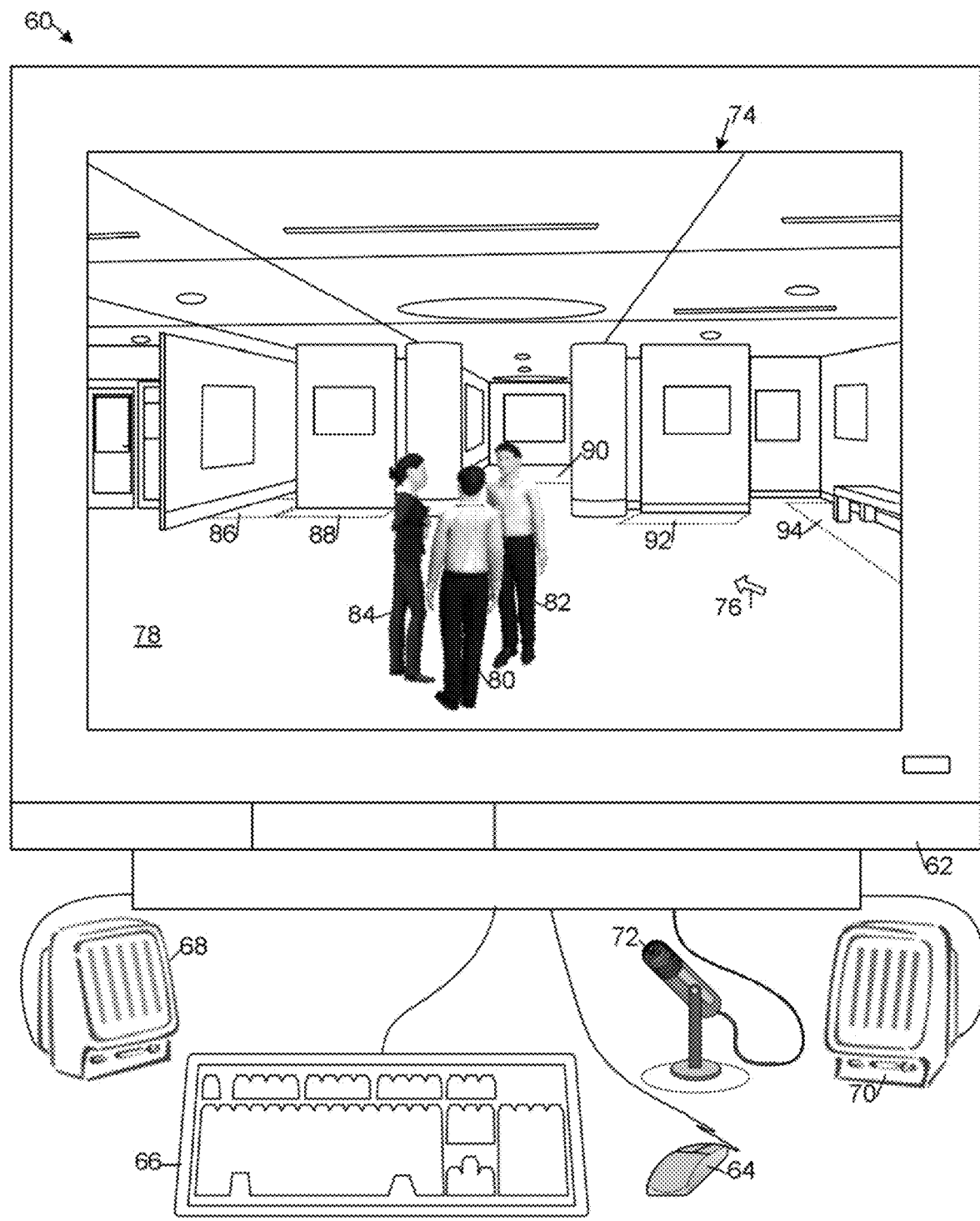
FIG. 4 is a diagrammatic view of an embodiment of a network node that includes a graphical user interface presenting a two-dimensional depiction of a shared virtual area.

FIG. 4 shows an embodiment of an exemplary network node that is implemented by a computer system 60. The computer system 60 includes a display monitor 62, a computer mouse 64, a keyboard 66, speakers 68, 70, and a microphone 72. The display monitor 62 displays a graphical user interface 74, the graphical user interface 74 is a windows-based graphical user interface that can include multiple windows, icons, and a pointer 76. In the illustrated embodiment, the graphical user interface 74 presents a two-dimensional depiction of a shared virtual area 78 that is associated with a three-dimensional visualization representing an art gallery. Communicants are represented in the virtual area 78 by respective avatars 80, 82, 84, each of which may have a respective role (e.g., a curator, an artist and a visitor) in the context of the virtual area 78.

As explained in detail below, the virtual area 78 includes zones 86, 88, 90, 92, 94 that are associated with respective rules that govern the switching of realtime data streams between the network nodes that are represented by the avatars 80-64 in the virtual area 78. (During a typical communication session, the dashed lines demarcating the zones 86-94 in FIG. 4 are not visible to the communicants although there may be visual cues associated with such zone boundaries.) The switching rules dictate how local connection processes executing on each of the network nodes establishes communications with the other network nodes based on the locations of the communicants' avatars 80-84 in the zones 86-94 of the virtual area 78.

During a communication session, each of the communicant network nodes generates a respective set of realtime data streams (e.g., motion data streams, audio data streams, chat data streams, file transfer data streams, and video data streams). For example, each communicant manipulates one or more input devices (e.g., the computer mouse 64 and the keyboard 66) that generate motion data streams, which control the movement of his or her avatar in the virtual area 78. In addition, the communicant's voice and other sounds that are generated locally in the vicinity of the computer system 60 are captured by the microphone 72. The microphone 72 generates audio signals that are converted into realtime audio streams. Respective copies of the audio streams are transmitted to the other network nodes that are represented by avatars in the virtual area 18. The sounds that are generated locally at these other network nodes are converted into realtime audio signals and transmitted to the computer system 60. The computer system 60 converts the audio streams generated by the other network nodes into audio signals that are rendered by the speakers 68, 70. The motion data streams and audio streams may be transmitted from each of the communicant nodes to the other communicant network nodes either directly or indirectly. In some stream handling topologies, each of the communicant network nodes receives copies of the realtime data streams that are transmitted by the other communicant network nodes. In other stream handling topologies, one or more of the communicant network nodes receives one or more stream mixes that are derived from realtime data streams that are sourced (or originated) from other ones of the network nodes.

A virtual area is defined by a specification that includes a description of geometric elements of the virtual area and one or more rules, including switching rules and governance rules. The switching rules govern realtime stream corrections between the network nodes. The governance rules control a communicant's access to resources, such as the virtual area itself, regions with the virtual area, and objects within the virtual area. In some embodiments, the geometric elements of the virtual area are described in accordance with the COLLADA-Digital Asset Schema Release 1,4,1 April 2006 specification (available from http://www.khronos.org/collada/), and the switching rules are described in accordance with the COLLADA Streams Reference specification described in U.S. application Ser. Nos. 11/923,629 and 11/923,634.

The geometric elements of the virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally ma include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the area clients or only to respective connections with individual area clients. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. application Ser. Nos. 11/923,629 and 11/923,634. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one of more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the documents, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. application Ser. No. 61/042114 (which was filed on Apr. 4. 2008), U.S. application Ser. No. 11/923,629 (which was filed on Oct. 24. 2007), and U.S. application Ser. No. 11/923,634 (which was filed on Oct. 24, 2001).

4. Positions in Software Applications and Computer Data Files

Some embodiments of the pervasive realtime framework 12 enable software application designers to define the semantics of position in a software application or a computer data file. Through associations with respective connection rules, these position definitions can he used, for example, to drive connections to virtual areas, entries into virtual areas, connections to communicants and other sources or sinks of realtime data streams, and determinations of presence data relating to communicants, network resources, and network services.

As defined above, a computer data file is any block of information that durably stores data for use by a software application (e.g., information used as input. and/or written as output for a software application). A computer data file may be designed for use with any type of software application, including consumer and business software applications, and may be stored in any type of open or closed data file format. A computer data file is composed of one or more components whose contents and structures depend at least in part on the type and purpose of the data stored in the computer data file and on the software used to create it. For example, computer data files for use with desktop publishing software application typically have components that correspond to predefined sections or data categories, such as text arranged in sentences, paragraphs, headings and blocks, drawings, tables, rows/columns, pages drawing sheets, presentation slides, and spreadsheets, or function features, such as security features or authentication features. A software application developer or an end-user may define one of more sections of a computer data file that are composed of one or more constituent components of the computer data file. A section may encompass an entire computer data file or a portion of the computer data file, and may overlap another section in whole or in part.

Figures 5A, 5B:
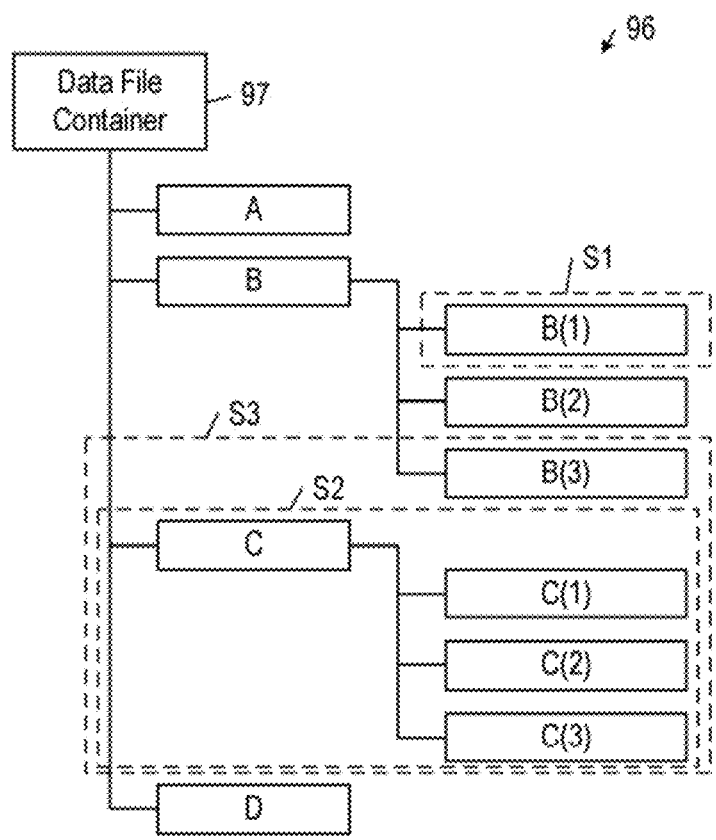
FIG. 5A is a block diagram of an embodiment of a computer data file.
FIG. 5B is a diagrammatic view of an embodiment of a computer data file section definition database storing records that define sections of the computer data file of FIG. 5A.

FIG. 5A shows an exemplary computer data file 96 that includes a data file container 97 that holds a hierarchical arrangement or components A, B, C, D, subcomponents B(1), B(2), and B(3) of component B, and subcomponents C(1), C(2), and C(3) of component C. The computer data file 96 is divided into three sections (S1, S2, S3), each of which is associated with one or more of the components and the subcomponents of the computer data file 96. For example section S1 is associated with subcomponent B(1), section S2 is associated with component C, and section S3 is associated with subcomponent. B(3) and component C.

The associations between components and sections of a computer data file may be stored in a variety of different data structure formats. For example. FIG. 5B shows an exemplary computer data file section definition database 98 that contains records that define the sections in the computer data file 96. The section definition records are indexed by a record identifier and an identifier of the computer data file 96. In some embodiment, the PRT framework 12 provides functions that allow a software application developer to design a software application with one or more dialog boxes that can be used by the end-user to create records in the computer data file section definition database 98.

As defined above, a software application is a set of instructions that a computer can interpret and execute after the instructions have been loaded into a storage medium (e.g., hard drive, memory, or random access memory), software application is composed of one or more logical components (e.g., hardwired, temporal, contextual, table lookup components) or functional components (e.g., functions or entry points) whose contents and structures depend at least in part on the functionality of the software application and architecture of its design. For example, some software applications use a componentized architecture that is made up of a number of components, each of which may be contained in a separate library and may expose a respective set of interfaces that enable it to be hosted by a main executable. A software application developer may define one or more sections of a software application that are composed of one or more components of the software application. A section may encompass an entire software application or a portion of the software application, and may overlap another section in whole or in part.

Figures 6A, 6B:
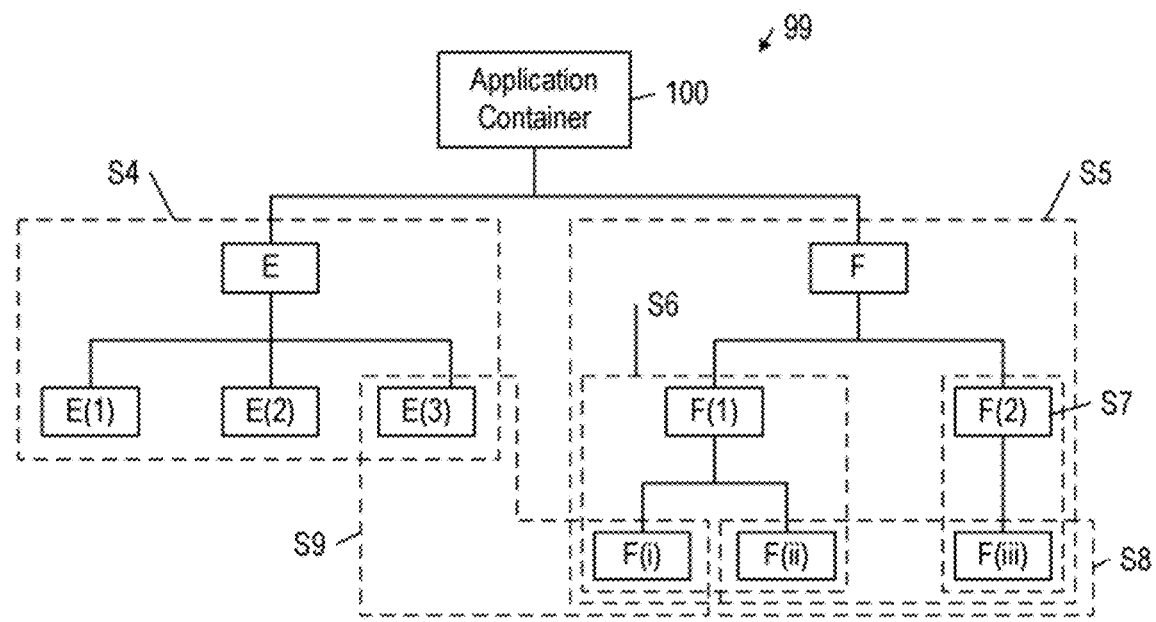
FIG. 6A is a block diagram of an embodiment of a software application file.
FIG. 6B is a diagrammatic view of an embodiment of a software application section definition database storing records that define sections of the software application of FIG. 6A.

FIG. 6A shows an exemplary software application 99 that includes an application container 100 that holds a hierarchical arrangement of components E, F, subcomponents E(1). F(2), and E(3) of component F, subcomponents F(1), F(2) of component F, subcomponents F(i) and F(ii) of subcomponent F(1), and a subcomponent F(iii) of subcomponent F(2). The software application 100 is divided into six sections (S4, S5, S6, S7, S8, S9) each of which is associated with one or more of the components and subcomponents of the software application 99. For example, section S4 is associated with subcomponent B(1), section S5 is associated with component F, section S6 is associated with subcomponent F(1), section S7 is associated with subcomponent F(2), section S8 is associated with subcomponents F(ii) and F(iii), and section S9 is associated with subcomponents E(3) and F(i).

The associations between components and sections of a software application may be stored in a variety of different data structure formats. For example, FIG. 6B shows an exemplary software application section definition database 102 that contains records that define the sections in the software application 99. The section definition records are indexed by a record identifier and an identifier of the software application 99. In some embodiments, the PRT framework 12 provides one or more dialog boxes that allow a software application developer to create database records in the software application section definition database 102.

Referring to FIGS. 7A, and 7B, in some embodiments, the one or more sections of a computer data file or a software application are associated with respective zones of a virtual area.

For example, in some embodiments, the one or more sections of a computer data rile or a software application are associated with respective zones of an abstract virtual area that is defined with respect to coordinates in a one-dimensional or multi-dimensional abstract topological space that has a one-to-one mapping to positions in the associated computer data file or software application. For example, FIG. 7A shows an exemplary mapping of the sections S4-S9 of the software application 99 to respective coordinates in a two-dimensional topological space that has coordinates that map directly to respective ones of the components and subcomponents of the software application 99.

In other embodiments, the one or more sections of computer data file or a software application are associated with respective zones of one or more visual virtual areas, each of which may he defined with respect to one-, two- or three-dimensional geometric coordinates that are associated with a respective visualization. For example, FIG. 78 shows an exemplary mapping of the sections S4-S9 of the software application 99 to respective coordinates of two visual virtual areas 104 and 78. In this example, section S4 is associated with the visual virtual area 104, which is associated with a three-dimensional visualization of a conference room, and sections S5-S9 are associated with respective zones of the visual virtual area 78, which is associated with a three-dimensional visualization of an art gallery.

5. Connection Rules

The PRT framework 12 provides functions that enable a software application developer to incorporate into a software application took (e.g., dialog boxes and the like) that allow an end-user to associate a computer data file or a software application with one or more connection rules. A computer data file or software application can be associated with a connection rule in a variety of different ways. In some embodiments, a computer data file is associated with a connection rule by storing the connection rule or a reference to the connection rule in an attributes database that is managed by a file manager service of the operating system (e.g., in extended file attributes that can be associated with the computer data file at the file system level of an operating system). In some embodiments, a software application is associated with a connection rule by storing the connection rule or a reference to the connection rule in a header of a software application file (e.g., a header or segment that describes how the software application should be loaded into memory by a program loader service of an operating system In some embodiments a computer data file or software application is associated with a connection rule by storing the connection rule or a reference to the connection rule in a separate database record that is indexed by an identifier of the computer data file or software application.

In the illustrated embodiments, computer data files and software applications are associated with instances of reusable connection objects each of which encapsulates one or more connection rules and one or more optional methods. Each connection rule designates at least one of a virtual area and a connection target, and includes an optional set of one or more connection conditions that influence the establishing of a network connection, the managing of a network connection, or the processing of data transferred across a network connection. The types of methods encapsulated in a connection object include, for example, a method that invokes a function of the PRT framework 12 and a method that exposes the connection rules, which may be used by the PRT framework 12, the operating system, or may be presented to the user in a graphical interface.

Figures 8, 9:
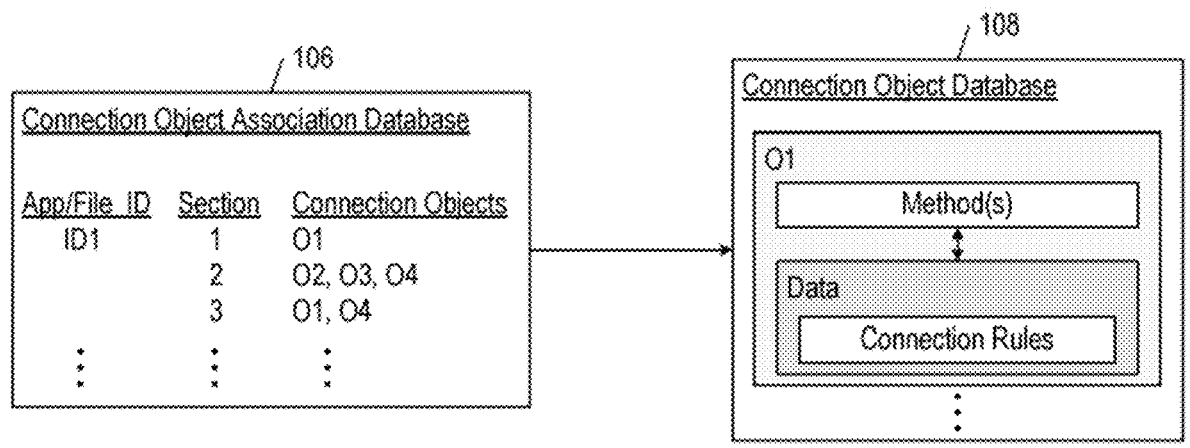
FIG. 8 is a diagrammatic view of an embodiment of a connection object association database containing records with connection object identifiers pointing to respective records in an embodiment of a connection object database.
FIG. 9 is a diagrammatic view of an embodiment of a connection object database.

The sections of a computer data file or a software application typically are associated with instances of respective ones of the connection objects by respective records in a connection object association database that indexes each of the records with an identifier of the computer data file or software application and an identifier of the associated section. FIG. 8 shows an exemplary connection object association database 106 that includes for each section of a computer data file or software application a respective record that ;associates the section) with one or more references (e.g., O1, O2, O3, O4, etc.) to one or more respective connection objects that are indexed in a connection object database 108.

FIG. 9 shows an embodiment 110 of the connection object database 108 that includes for each connection object an exemplary set of possible attributes (or fields) that are indexed by an Object ID attribute key whose value corresponds to an identifier of the connection object (e.g., O1). Among the exemplary attributes that are included in the connection object database 108 are an Area Designation attribute, a Connection Target Designation attribute, and a Connection Conditions attribute.

The Area Designation attribute contains an area designation value that identifies or can be used to identify an instance of a virtual area. For example, the area designation value may correspond to any of a schema identifier (e.g., Schema_ID) that identifies a virtual area schema, an area identifier (e.g., Area_ID) that identifies an instance of a virtual area, a query on the interaction database that returns identifiers of virtual area instances, and a reference to another area (e.g., a virtual area outside the domain of the associated software application or computer data file), The Connection Target Designation attribute contains one or more connection target designations that identify or can be used to identify one or more connection targets. For example, the connection target designation may include at least one of information identifying a single Communicant, information identifying a group of communicants, and a definition of a role associated with at least one communicant. The connection target designation may correspond to identifiers of one or more specific connection targets (e.g., fixed network resources and specific communicants) and one or more queries that return identifiers of connect targets. Exemplary queries include a query to the rendezvous service 48 for any of the connection targets that currently are in a specified virtual area instance, a query to the rendezvous service 48 for specific connection targets that currently are in a specified virtual area instance, a query to the rendezvous service 48 for connection targets that are associated with one or more attributes (e.g., a particular role attribute value or a particular group identifier value), and a query to the interaction service 50 for connection targets that have interacted with the user and optionally are associated with one or more other attributes (e.g., connection targets that are associated with a specified virtual area instance or a specified attribute value, such as a particular role attribute value or group identifier value).

The Connection Conditions attribute contains one or more connection condition definitions that specify one or more connection conditions. Each connection condition specifies one or more parameters that influence the operation of the PRT framework 12 in connecting to a virtual area instance or a connection target designated in the associated connection rule, for example, a connection target may specify one or more parameters that influence any of the establishing of a network connection, the managing of a network connection, the processing of data transferred across a network connection and the presentation of connection-related information to the user.

Some connection conditions describe a predicate on the current connection context that should be satisfied before a network connection is attempted or established. Exemplary conditions of this type include a connection condition that restricts when the network connection is permitted, a condition that restricts the establishment of network connections to network nodes meeting specified resource requirements, a condition that restricts the establishment of network connections to network nodes meeting specified node configuration requirements, a condition that restricts the establishment of network connections to network nodes meeting specified network node location requirements, and a condition that restricts the establishment of network connections to times meeting specified connection target availability requirements.

Other connection conditions include conditions on the instantiation behavior of virtual areas (e.g., a new instance of a virtual area schema should be instantiated each time a software application is run), and conditions on the way that the results of queries should be handled (e.g., present the results to the user in a graphical interface or automatically connect to a connection target when only a single connection target identified is returned in response to a query).

Depending on the implementation of the operating environment, connection objects and their constituent connection rules may be added, modified, or deleted by a variety of different functions and services. For example, in some embodiments, a connect rule may be added, modified, or deleted by a software application developer, a local system administrator, an end user, the PRT framework 12, or one or more of the network infrastructure services in the network infrastructure service environment 43.

IV. System Architecture

A. Overview

1. Introduction

A communicant typically connects to the network 42 (see FIG. 1) from a network node, which typically is implemented by a general-purpose computer system or a dedicated communications computer system (or "console", such as a network-enabled video game console). The network node executes communications processes that establish realtime data stream connections with other network nodes and typically executes visualization rendering processes that present a view of each virtual area entered by the user. In some embodiments, multiple communicants may share a single network node.

Figure 10:
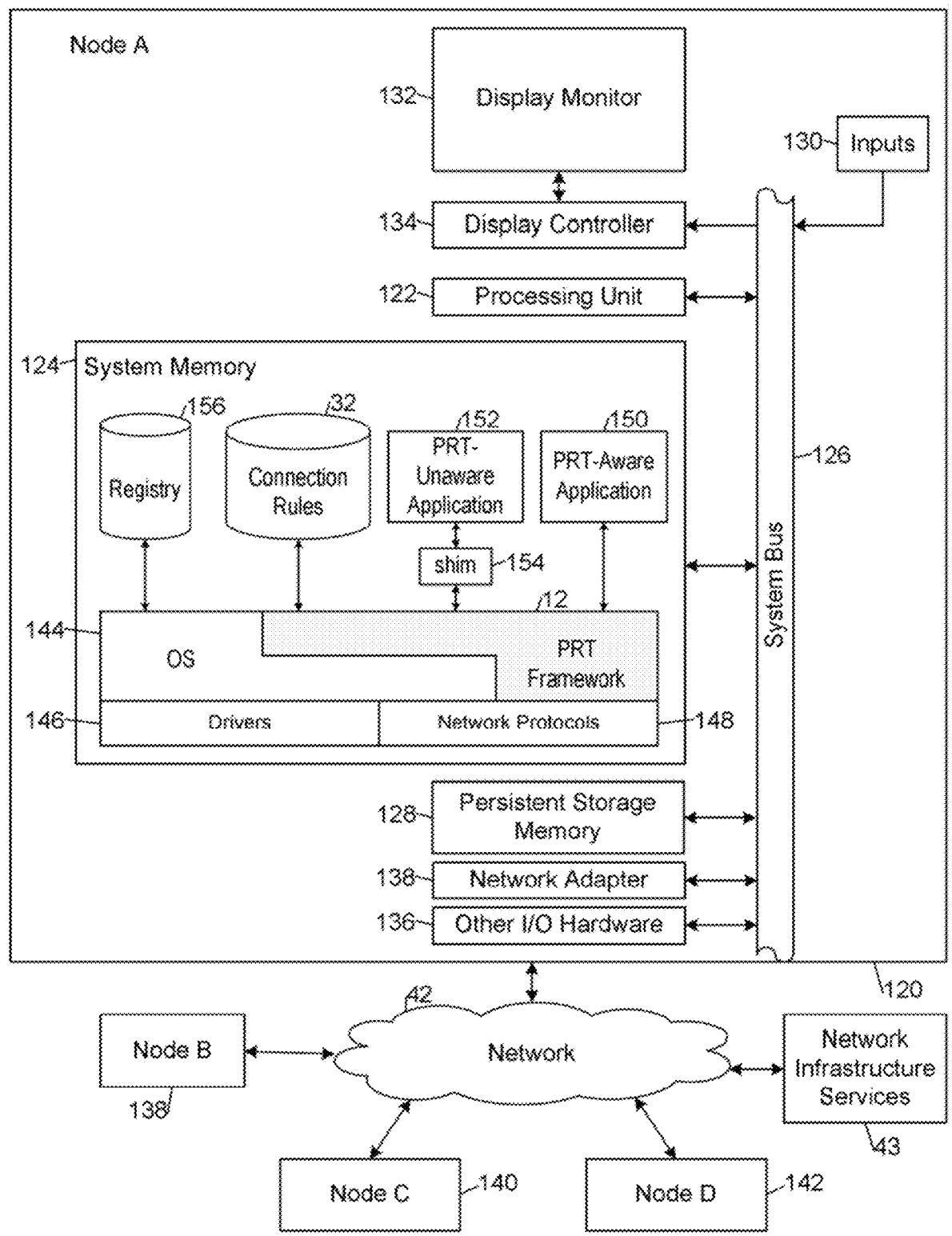
FIG. 10 is a block diagram of an embodiment of a network node connected to three other network nodes in an embodiment of the operating environment of FIG. 1.

FIG. 10 shows an embodiment of a network node that is implemented by a computer system 120 that includes a processing unit 122, a system memory 124, and a system bus 126 that couples the processing unit. 122 to the various components of the computer system 120. The processing unit 122 may include one or more data processors, each of which may be in the form of any one of various commercially available computer processors. The system memory 124 may include a read only memory (ROM) that stores a basic input/output system (BIOS) that contains start-up routines for the computer system 120 and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A user may interact (e.g., input commands or data) with the computer system 120 using one or more input devices 130 (e.g. one or more keyboards, computer mice, microphones, cameras, joysticks, physical motion sensors such Wii input devices, and touch pads). Information may be presented through a graphical user interface (GUI) that is presented to the communicant on a display monitor 132, which is controlled by a display controller 134. The computer system 120 also may include other input/output hardware 136 (e.g., peripheral output devices, such as speakers and a printer). The computer system 120 connects to other network nodes 138, 140 142 through a network adapter 138 (also referred to as a "network interface card" or NIC).

A number of program modules may be stored in the system memory 124, including an operating system (OS) 144 (e.g., the Windows XP® operating system available from Microsoft Corporation of Redmond, Wash. U.S.A.), the PRT framework 12, drivers 146 (e.g., a GUI driver), network protocols 148, a PRT-aware software application 150, a PRT-unaware software application 152 that connects to the PRT framework 12 through a shim 154, and data (e.g., input data, output data, program data, a registry 156, and the connection rules 32). In some embodiments the shim 154 is implemented by an extension module (e.g., a plugin) or a macro.

2. Operating System

The operating system 144 hosts software applications by providing the base operating system services for creating a run-time execution environment on the computer system 120. Among the exemplary types of services that typically are provided by the operating system are resource management, file management, security, authentication, verification, notification, and user interfaces (e.g., windowing, menus, dialogs, etc.).

The services relating to the management of the resources (e.g., memory, processors, and I/O devices) of the computer system 120 typically are implemented by a kernel. File management may be implemented by the kernel or it may be implemented by a separate file system manager (e.g., the installable file system, which is provided in some Microsoft® Windows® operating systems). In the process of opening a file (e.g., a computer data file or a software application file), the file system manager typically calls an appropriate file system driver that looks up the disk storage location of the file in a database (e.g., a file allocation table, such as FAT, FAT98, VFAT, MFT, arid CDFS) that maps out the storages locations of the file on the disk. Other operating system functions, such as security, authentication, verification, notification, and user interfaces, may be provided by one or more other components of the operating system (e.g., the executive services layer in some Microsoft® Windows® operating systems).

Among the exemplary types of services that typically are provided by the kernel are process management, memory management, device management, and system call handling. Process management includes running applications and providing an application programming interface (API) to hardware components of the computer system. In the process of running a software application, the kernel typically sets up an address space in memory for the software application, loads a file that contains the software application code into the address space, and executes the loaded software application code. Memory management involves managing software application accesses to the system memory 124. Device management involves providing access to hardware devices through device drivers. System call handling involves providing an API that exposes the kernel services to user mode software applications. By invoking the API (e.g., through inter-process communication mechanisms and system calls), a software application can request a service from the kernel, pass parameters, and receive results that are generated by the service in response to the request.

The operating system 144 typically stores hardware and software configuration information, user preferences, and setup information in the registry 156. For example, the registry 156 typically contains the following information: parameters that are needed to boot and configure the system; system-wide software settings that control the operation of the operating system 144; a security database: and per-user profile settings. In some embodiments, the connection rules 32 are stored in the registry 156 instead of a separate database.

3. Network Protocols

The network protocols 148 control or enable the connection, communication, and transfer of data between the computer system 120 and other network nodes. Exemplary types of network protocols include the Transmission Control Protocol/Internet Protocol (TCP/IP), the User Datagram ProtocolInternet Protocol (UDP/IP), and the Realtime Transport Protocol (RTP).

The TCP/IP includes a TCP portion and an IP portion. The TCP portion of the protocol provides the transport function by breaking a message into smaller packets, reassembling the packets at the other end of the communication network, and re-sending any packets that get lost along the way. The IP portion of the protocol provides the routing function by assigning to the data packets addresses for the destination network and the target node at the destination network. Each data packet that is communicated using ICP/IP includes a header portion that contains the TCP and IP information. The IP provides no guarantee of packet delivery to the upper layers of the communications stack. The TCP on the other hand provides a connection-oriented, end-to-end transport service with guaranteed, in-sequence packet delivery. In this way, the TCP protocol provides a reliable, transport layer connection.

The UDP may be used in place of TCP in conditions when a reliable delivery is not required. For example. UDP/IP may be used for realtime audio and video traffic where lost data packets are simply ignored because of any of the following reasons: there is no time to retransmit or any degradation of overall data quality is acceptable.

The RTP defines a standardized packet format for delivering audio and video over network connections. A variety of network protocols may be used in transmitting and receiving RTP data between network nodes, including peer-to-peer networking frameworks, a centralized server using TCP sockets alone or in combination with UDP, and multicast protocols.

4. Device Drivers

The device drivers 146 typically are implemented by software applications that enable other software applications (e.g., user-mode software applications and the operating system) to interact with hardware devices that are connected to the computer system 120. A device driver typically provides an API for functions that can be invoked by the other software applications in order to translate commands and data that are transferred between the software applications and the hardware device.

5. PRT Framework

The PRT framework 12 includes a PRT API and a PRT kernel.

The PRT All exposes high-level functions that significantly reduce the effort and time needed to develop realtime software applications in a new operating environment paradigm in which realtime connections between network nodes are pervasive. Some of these functions use position in at least one of a computer data file and a software application to control connections to virtual areas, entries into virtual areas, connections to communicants and other sources or sinks of realtime data streams, and determinations of presence data relating to communicants and network resources and services.

The PRT kernel includes services that control the switching of realtime data streams between the computer system 120 and the other network nodes 138. 140, 142. In embodiments, the PRT kernel also includes processes that control the presentation of a respective view of a virtual area and objects in the virtual area on the display monitor 132. In this regard, the PRT kernel interfaces with the operating system functions that communicate with the drivers 148 to translate commands and data to and from the display controller 134 and the user inputs 130 in order to present the views of the virtual area and allow the communicant to control interactions in the virtual area.

Implementations of the PRT API and the PRT kernel include one or more discrete modules or libraries (e.g., dynamic linked libraries) that are not limited to any particular hardware firmware, or software configuration. In general, these modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components. In some implementations, process instructions (e.g., computer-readable code, such as computer software.) for implementing the methods that are executed by the embodiments of the PRT API and the PRT kernel, as well as the data they generate, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROW-RAM, and CD-ROM/RAM.

6. Exemplary System Level Functionality

The PRT framework 12 cooperates with the network infrastructure service environment 43 in the administration of the network connections between the computer system 120 and the other network nodes 138, 140, 142. Among the exemplary system level functionalities that are involved in the process of administering network connections are logging into the network infrastructure service environment 43 and executing connection rule based PRT framework operations, including determining instances of virtual areas and ascertaining connection targets via at least one of the rendezvous service 48 and the area service 46.

a. Logging into the Network Infrastructure Service Environment

Figure 11:
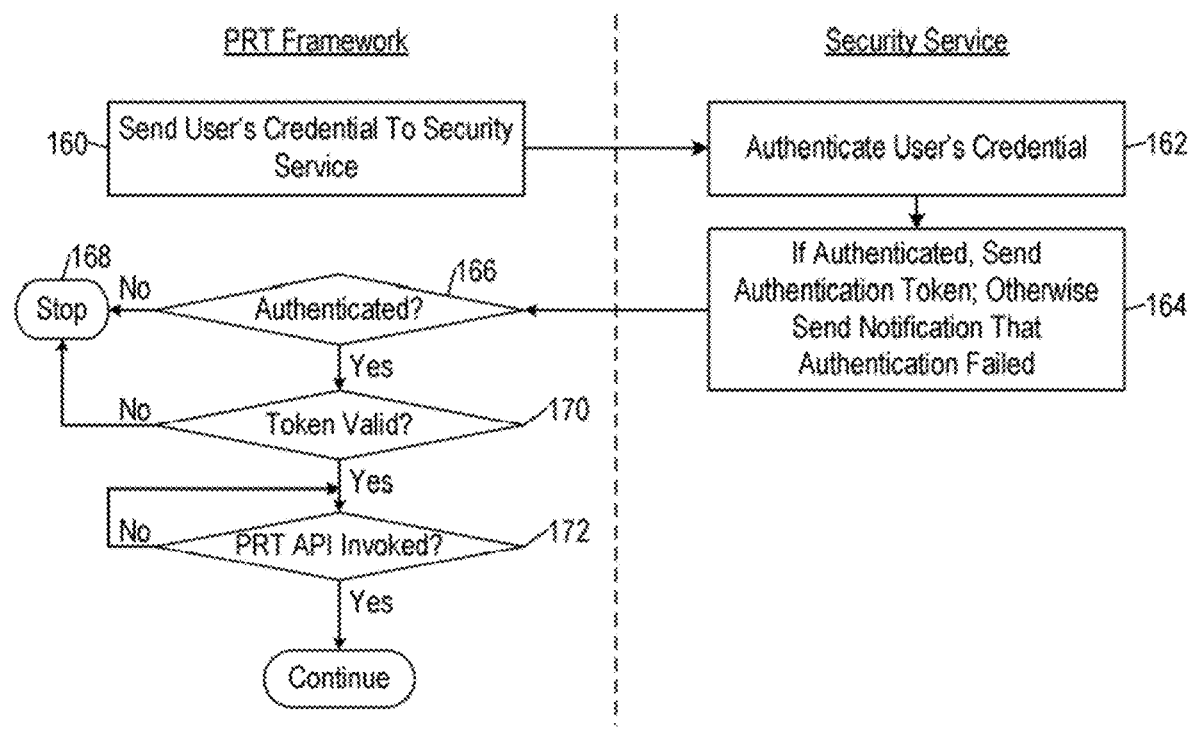
FIG. 11 is a flow diagram of an embodiment of a method of logging into an embodiment of the network infrastructure service environment of FIG. 1.

In some embodiments, authentication with the network infrastructure service environment 43 is performed once each time the PRT framework 12 is launched. The authentication process typically is based on a credential that is securely issued to the user at the time the PRT framework 12 is installed on the computer system 120. The credential typically is a certificate that is signed by a certificate authority. The certificate contains a private key and a public key. The PRT framework 12 creates a new credential that contains only the public key and securely stores the private key on the computer system 120. The computer PRT framework 12 creates a signature using the private key to encrypt a digest of a user-supplied password, and transmits the signature to the security service 44, the security service 44 recovers the digest and stores it as the user's identifying secret, FIG. 11 shows an embodiment of a method in which the PRT framework 12 logs into the network infrastructure service environment 43 after the security service 44 has received the user's identifying secret. In accordance with this method, the PRT framework 12 establishes a session with the security service 44 and sends the user's credential to the security service 44 (FIG. 11, block 160). The security service authenticates the credential received from the PRT framework 12 (FIG. 11, block 162). If the user's credential is authenticated, the security service sends an authentication token to the PRT framework 12; otherwise, the security service notifies the PRT framework 12 that the authentication failed (FIG. 11, block 164). If the authentication failed (FIG. 11, block 166), the PRT framework 12 notifies the user and the log-in process stops (FIG. 11, block 68). If the authentication of the user's credential is successful (FIG. 11, block 166) the PRT framework 12 validates the token received from the security service 44 (FIG. 11, block 170). If the token is valid (FIG. 11, block 170), the PRT framework waits for an invocation of the PRT API by a software application or an operating system call before proceeding (FIG. 11, block 72). After it has been verified, the security service token can be to authenticate the user to any of the network infrastructure services. In some embodiments, the PRT framework 12 may perform background tasks (e.g., caching interaction data and other resources so as to increase the responsiveness of the PRT framework 12 in administering connections and performing other tasks) while waiting for an invocation of the PRT API.

b. Connection Rule Based PRT Framework Operations i. Overview

A connection rule can be associated with a definition of at least one respective section in an interaction space that is defined with respect to at least one of the software application and the computer data file. The PRT framework can determine the connection rule based at least in part on the current focus in relation to the at least one section in the interaction space and then initiate the transfer of one or more realtime data streams with one or more of the network nodes in accordance with the connection rule. In these embodiments, the PRT framework 12 is invoked with a PRT API call that typically includes a definition of position in at least one of a software application and a computer data file. The definition of position may he provided by, for example, a PRT-aware software application that determines a current focus of a user with respect to the interaction space defined by at least one of the software application and the computer data file. Alternatively, the definition of position may be provided by an operating system service (e.g., a program loader service or a file manager service) that determines the position definition from metadata that is associated with at least one of the software application and the computer data file (e.g., in the header of the software application file or in a file attributes database associated with the computer data file) or from a user interface service of the operating system that controls the windowing environment.

Figure 12:
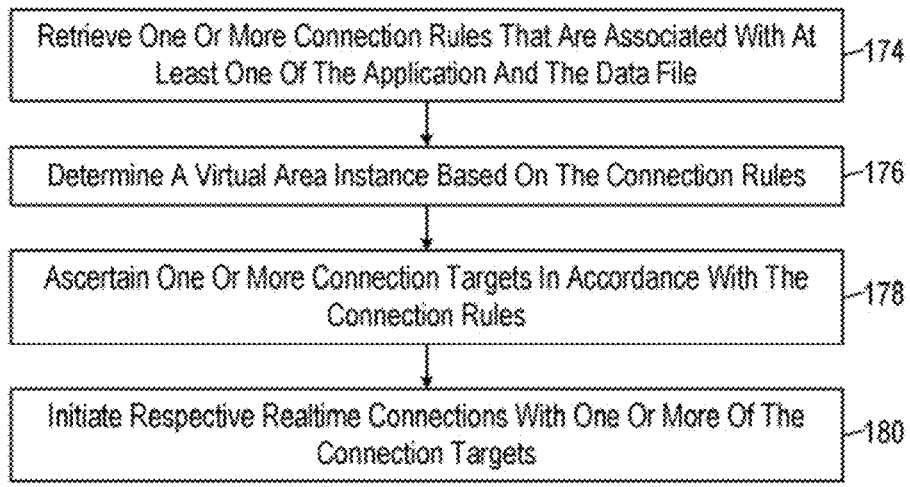
FIG. 12 is a flow diagram of an embodiment of a method that is implemented by an embodiment of the pervasive realtime framework of FIG. 1.

FIG. 12 shows an embodiment of a method that is implemented by the PRT framework 12 in response to a PRT API that includes a definition of position in at least one of a software application and a computer data file.

In accordance with this method, the PRT framework 2 retrieves one or more connection rules that are associated with at least one of the software application and the computer data file (FIG. 12, block 174). In some embodiments, the PRT framework 12 queries the connection object association database 106 (see FIG. 8) for the identifiers of at least one connection object that is associated with the section of the software application or computer data file that correspond to the position definition contained in the PRT API call. The PRT framework 12 retrieves the connection object that corresponds to the connection object identifier from the connection object database 108 (see FIG. 8), and determines at least one connection rule that is defined in the connection object.

As explained above, a connection rule designates at least one of a virtual area and a connection target, and may include one or more optional connection conditions that guide the behavior of a suitably configured software application or service in administering network connections. If a virtual area is designated in the connection rule, the PRT framework 12 determines a virtual area instance based on the virtual area designation (FIG. 12, block 176). The framework 12 ascertains one or more connection targets in accordance with the connection rules (FIG. 12, block 178). For example, the connection targets may be ascertained through their designation in the connection rules or through their associations with the virtual area instance (e.g., the ascertained connection targets are those targets that are associated with objects that currently are in the virtual area instance). If the connection rule designates one or more connection targets without designating a virtual area the PRT framework 12 typically ascertains the connection targets via the rendezvous service 48. If the connection rule designates a virtual area, the PRT framework 12 typically ascertains the connection targets via one or both of the area service 46 and the rendezvous service 48.

After the connection targets have been ascertained, the PRT framework 12 initiates respective realtime data stream connections with one or more of the connection targets (FIG. 12, block 180).

ii. Ascertaining Connection Targets Via the Rendezvous Service

Figure 13:
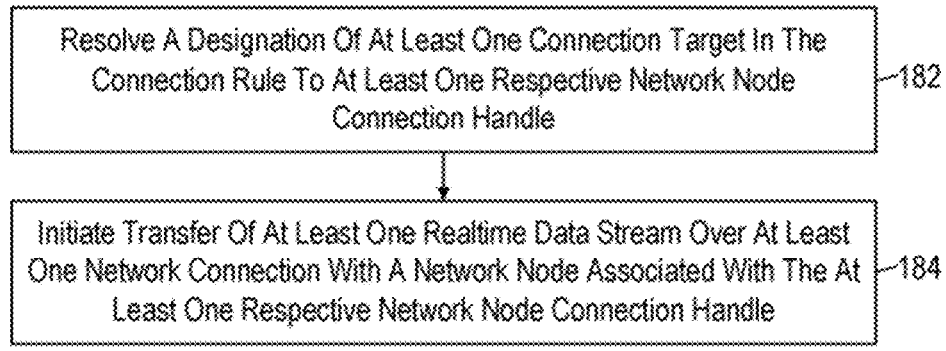
FIG. 13 is a flow diagram of an embodiment of a method that is implemented by an embodiment of the pervasive realtime framework of FIG. 1 in ascertaining connection targets via an embodiment of a rendezvous service.

FIG. 13 shows an embodiment of a method that is implemented by the PRT framework 12 in the process of connecting to a connection target through the rendezvous service 48.

In accordance with the method of FIG. 13, the PRT framework 12 resolves a designation of at least one connection target in the connection rule to at least one respective node connection handle (FIG. 13, block 182). In this process, the PRT framework 12 authenticates the user to the rendezvous service 48 with the token received from the security service 44. After the user has been authenticated, the PRT framework 12 establishes a session with the rendezvous service 48. The PRT framework 2 then transmits to the rendezvous service 48 a request for a respective connection handle for each connection target corresponding to the connection target designation in the connection rule.

The rendezvous service 48 identifies the one or more connection targets that correspond to the connection target designation. It the connection rule designates specific connection targets with target identifiers, the rendezvous service 48 queries the presence database for the states and capability requirements of connection targets corresponding to the designated target identifiers. If the connection rule designates connection targets with a set of one or more attribute values, the rendezvous service 48 queries the presence database for the states and capability requirements that are associated with connection targets having attribute values that match the designated attribute values. The rendezvous service 48 compares the capabilities of the user with the capability requirements associated with each of the identified connection targets. The rendezvous service 48 transmits to the PRT framework 12 the respective connection handle of each of the identified connection targets whose capability requirements are satisfied.

After receiving the query results from the rendezvous service 48, the PRT framework 12 determines the applicability of any connection conditions that are contained in the connection rule. For example, the connection rule can include conditions on the way that the query results returned by the rendezvous service 48 should be handled. For example, a connection condition may specify that the. PRT framework 12 should present the results to the user in a graphical interface so that the user can select the one or more of the matching connection targets with which he or she would like to communicate. In another example, a connection condition may specify that the PRT framework 12 should automatically connect to the connection targets whose connection handles are returned in the query results. The connection rule also can include connection conditions that describe a predicate on the current connection context that should be satisfied before a network connection is made. Exemplary conditions of this type include a connection condition that restricts when the network connection is permitted, a condition that restricts the establishment of network connections to network nodes meeting specified resource requirements, a condition that restricts the establishment of network connections to network nodes meeting specified node configuration requirements, a condition that restricts the establishment of network connections to network nodes meeting specified network node location requirements, and a condition that restricts the establishment of network connections to times meeting specified connection target availability requirements.

Referring back to FIG. 13, after resolving the connection target designation to at least one respective connection handle (FIG. 13, block 182), the PRT framework 12 initiates transfer of at least one realtime data stream over at least one network connection with a network, node that is Associated with the connection handle subject to any applicable connection conditions that are specified in the connection rule (FIG. 13, block 184). As explained above, the connections between the PRT framework 12 and the other network nodes may be peer-to-peer connections or server-mediated connections. With respect to a peer-to-peer connection, the connection target network node and the PRT framework 12 typically authenticate one another and then establish a link over which to transmit the at least one realtime data stream either to or from the connection target. Links typically are one-way and requested by the transmitter and accepted or rejected by the receiver.

iii. Ascertaining Connection Targets Via the Area Service

Figure 14:
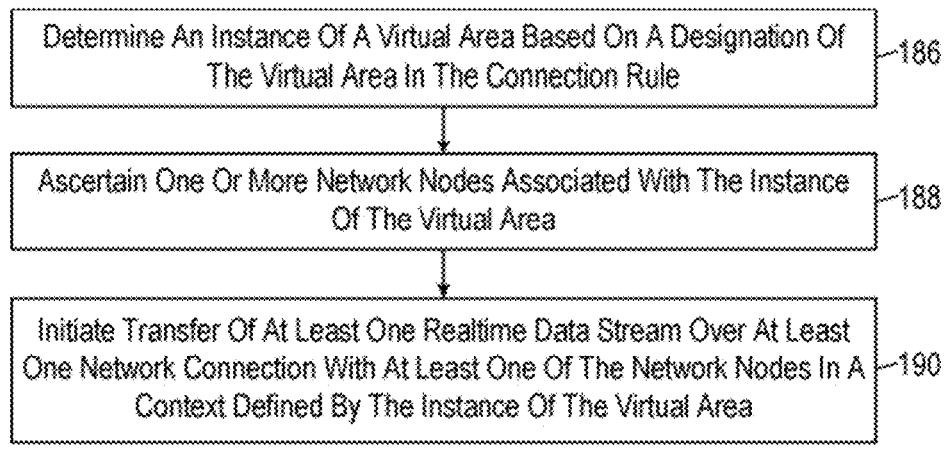
FIG. 14 is a flow diagram of an embodiment of a method that is implemented by an embodiment of the pervasive realtime framework of FIG. 1 in ascertaining connection targets via an embodiment of an area service.

FIG. 14 shows an embodiment of a method that is implemented by the PRT framework 12 in the process of connecting to a virtual area through the area service 46, In accordance with the method of FIG. 14, the PRT framework 12 determines an instance of a virtual area based on a designation of the virtual area in the connection rule (FIG. 14, block 186). In this process, the PRT framework 12 authenticates the user to the area service 46 with the token that the user received from the security service 44. After the user has been authenticated, the PRT framework 12 establishes a session with the area service 46. The PRT framework 12 then transmits to the area service 46 a request to connect to an instance of the virtual area designated in the connection rule.

The area service 46 determines an instance of the virtual area that corresponds to the virtual area designation in the connection rule. This process typically depends on the way in which the virtual area is designated (e.g., by schema identifier, virtual area instance identifier, or by one or more query attributes).

If the connection rule designates the virtual area by reference to a schema identifier, the area service 46 retrieves the schema corresponding to the schema identifier and creates an instance of the retrieved schema with an associated virtual area instance identifier. If the user's capabilities satisfy the capability requirements associated with the virtual area instance, the area service 46 returns configuration data to the PRT framework 12. The configuration data typically includes a definition of the virtual area instance and a register of the objects currently in the virtual area instance.

If the connection rule designates the virtual area by reference to an instance identifier, the area service 46 determines the state of the identified virtual area instance. If the virtual area instance is available (e.g., currently running) and the user's capabilities satisfy the capability requirements associated with the virtual area instance, the area service 46 returns configuration data to the PRT framework 12, where the configuration data typically includes a definition of the virtual area instance and a register of the objects currently in the virtual area instance. If the virtual area instance is unavailable (e.g., the virtual area instance currently is not running or connect accept any new communicants) but the user's capabilities satisfy the capability requirements associated with the virtual area instance, the area service 46 may create a new instance of the virtual area based on the schema for the original instance, and return configuration data to the PRT framework 12, where the configuration data typically includes a definition of the new virtual area instance and a register of the objects currently in the new virtual area instance.

1461 If the: connection rule designates the virtual area with a set of one or more query attribute values, the area service 46 transmits a request to the interaction service 50 to query the interaction database for all virtual area instances that have attributes matching the designated attribute values. The area service 46 determines the states and capability requirements that are associated with the virtual area instances that are identified in the query results returned by the interaction service 50. The area service 46 transmits to the PRT framework 12 the respective identifiers of each of the identified virtual area instances whose capability requirements are satisfied. After receiving the query results from the area service 46, the PRT framework 12 determines the applicability of any connection conditions that are contained in the connection rule. For example, the connection rule can include conditions on the way that the query results that are returned by the area service 46 should be handled. For example, a connection condition may specify that the PRT framework 12 should present the results to the user in a graphical interface so that the user can select which of the matching virtual area instances he or she would like to enter. In another example, a connection condition may specify that the PRT framework 12 should automatically enter the user into one of the virtual area instances based on a specified criterion (e.,g most frequently visited).

Referring back to FIG. 14, after determining the virtual area instance, (FIG. 14, block 186), the PRT framework 12 ascertains one or more network nodes that are associated with the instance of the virtual area (FIG. 14, block 188). In this process the PRT framework 12 reads the objects register that was received from the area service 46 in order to determine the network nodes that are associated with objects that currently are in the virtual area instance. In some embodiments, the PRT framework 12 also ascertains the network nodes associated with connection targets designated in the connection rule via the rendezvous service 48, as described in the preceding section.

The PRT framework 12 initiates transfer of at least one realtime data stream over at least one network connection with at least one of the ascertained network nodes in a context defined by the instance of the virtual area (FIG. 14, block 190). The connections between the PRT framework 12 and the other network nodes may be peer-to-peer connections or server-mediated connections. With respect to a peer-to-peer connection, the connection target network node and the PRT framework 12 typically authenticate one another, and hen establish a link over which to transmit the at least one realtime data stream either to of from the connection et. Links typically are one-way and requested by the transmitter and accepted or rejected by the receiver.

As explained above, the initiation of each realtime data stream connection is subject to any applicable connection conditions that are specified in the connection rule. For example, the connection rule can include connection conditions that describe a predicate on the current connection context that should be satisfied before a network connection is made. Exemplary conditions of this type include a connection condition that restricts when the network connection is permitted, a condition that restricts the establishment of network connections to network nodes meeting specified resource requirements, a condition that restricts the establishment of network connections to network nodes meeting specified node configuration requirements, a condition that restricts the establishment of network connections to network nodes meeting specified network node location requirements, and a condition that restricts the establishment of network connections to times meeting specified connection target availability requirements.

B. Exemplary System Architecture Embodiment

1. Introduction

Figure 15:
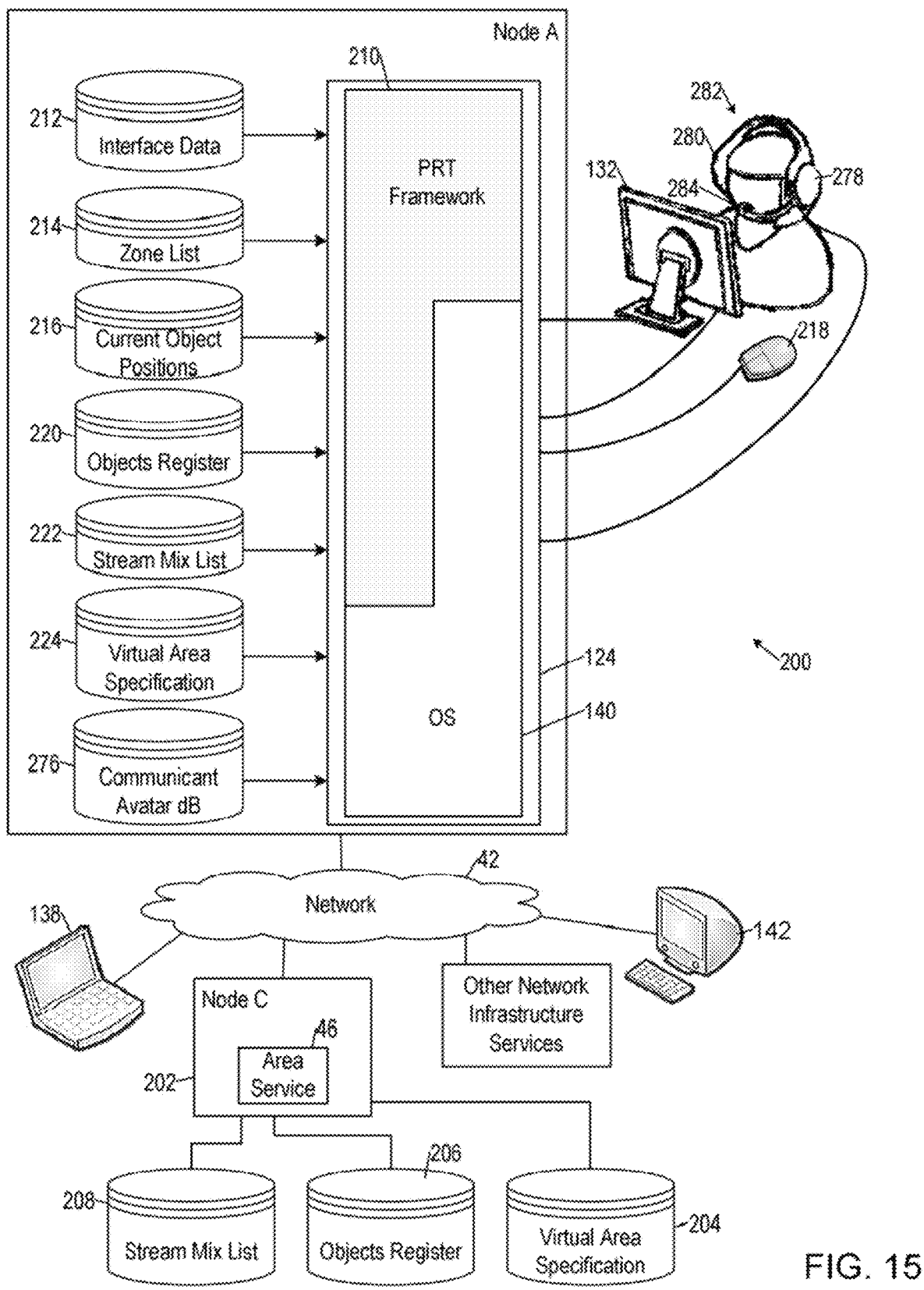
FIG. 15 is diagrammatic view of an embodiment of the operating environment shown in FIG. 10.

FIG. 15 shows an embodiment of the operating environment of FIG. 10 that includes an embodiment 200 of the computer system 120, and an embodiment 202 of the network node 140.

The network node 202 (Node C) hosts the area service 46. The area vice 46 maintains global state information and the network node 202 serves as a data server for the network nodes 200, 138, 142. Among the global state information that is maintained by the area service 46 are a current specification 204 of the virtual area, a current register 206 of the objects that are in the virtual area, and a list 208 of any stream mixes that currently are being generated by the network node 202.

The objects register 206 typically includes for each object in the virtual area a respective object identifier (e.g., a label that uniquely identifies the object), a connection handle (e.g., a URI, such as an. IP address) that enables a network connection to be established with a network node that is associated with the object, and interface data that identifies the realtime data sources and sinks that are associated with the object (e.g., the sources and sinks of the network node that is associated with the object). The objects register 206 also typically includes for each object one or more optional role identifiers, which may be assigned explicitly to the objects by either the communicants or the area service 46, or may be inferred from other attributes or the objects. In some embodiments, the objects register 206 also includes the current position of each of the objects in the virtual area as determined by the area service 46 from an analysis of the realtime motion data streams received from the network nodes associated with objects in the virtual area. In this regard, the area service 46 receives realtime motion data streams from the network nodes that are associated with objects in the virtual area, tracks the communicants' avatars and other objects that enter, leave, and move around in the virtual area based on the motion data. The area service 46 updates the objects register 206 in accordance with the current locations of the tracked objects.

The computer system 200 includes an embodiment 210 of the PRT framework 12. Among other functions, the PRT framework 210 administers realtime data stream connections with other network nodes. In this process the PRT framework 210 maintains a set of configuration data, including interface data 212, a zone list 214, and the positions 216 of the objects that currently are in the virtual area. The interface data 212 includes for each object that is associated with the computer system 200 a respective list of all the sources and sinks of realtime data stream types that are associated with the object. The zone list 214 is a register of all the zones in the virtual area that currently are occupied by the avatar associated with the computer system 200. When the user first enters a virtual area, the PRT framework 210 typically initializes the current object positions database 216 with position initialization information that is downloaded from the network node 202. Thereafter, the PRT framework 210 updates the current object positions database 216 with the current positions of the objects in the virtual area as determined from an analysis of the realtime motion data streams received from, for example, one or more of the computer mouse 218 and the network nodes 138, 202, 142. The configuration data that is maintained by the PRT framework 210 also includes copies 220, 222, 224 of the objects register 206, the stream mix list 208, and the virtual area specification 204, respectively: these copies 220, 220, and 222 typically am downloaded from the area service 46 and represent a local cache of these data. In some embodiments, the object positions 216 are incorporated into the objects register 220.

2. Operating System

Figure 16:
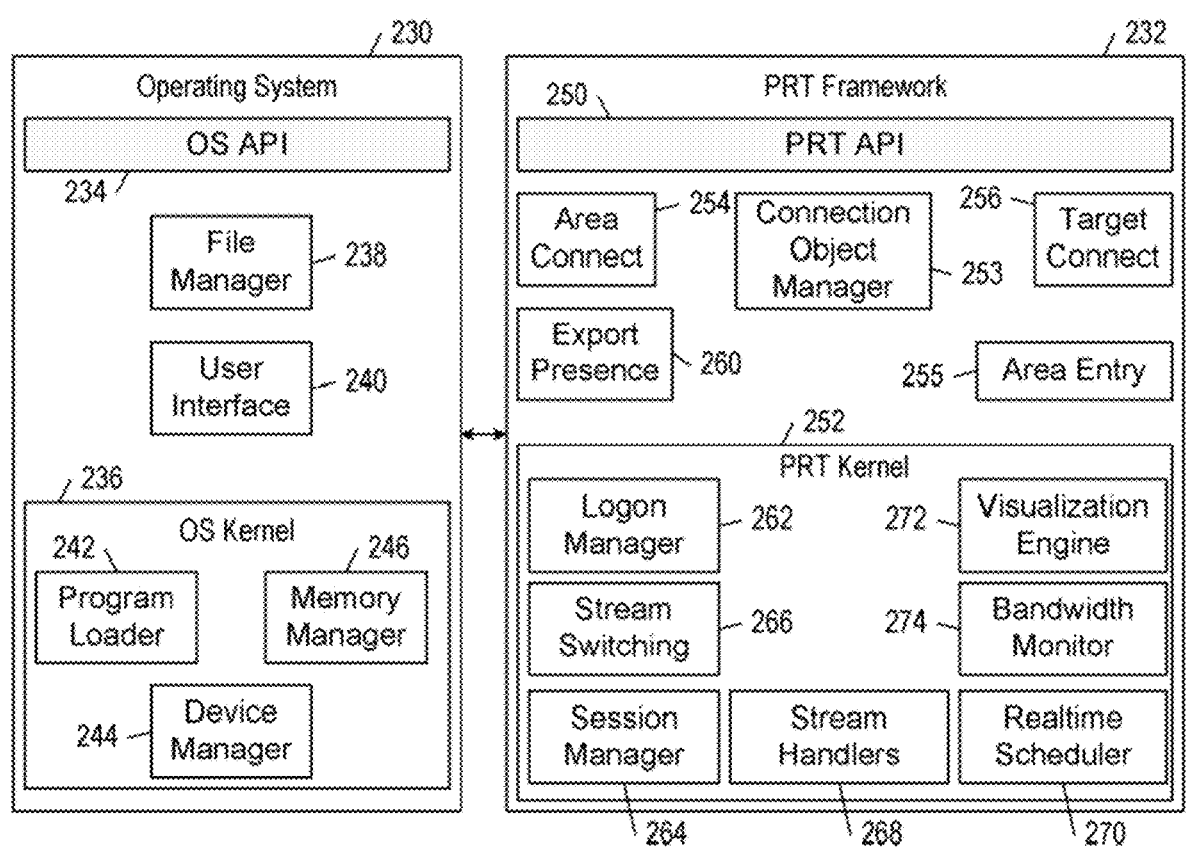
FIG. 16 is a diagrammatic view of an embodiment of an operating system and at embodiment of the pervasive realtime framework of FIG. 1.

FIG. 16 shows an embodiment 230 of the operating system 144.

The operating system 230 includes an OS API 234 and an OS kernel 236. The OS API 234 exposes the functions provided by the operating system 230, including a file manager service 238, a user interface service 240, and the functions provided by the services of the OS kernel 236. The file manager service 238 manages the storing and the retrieving files and metadata (e.g., file attributes) that are associated with computer data files and software application files. The user interface service 240 manages the windowing environment, including the presentation of dialog boxes and graphics on the display 132. In the illustrative embodiment shown in FIG. 16, the OS kernel 236 includes a program loader service 242, a device manager service 244 and a memory manager service 246. The program loader service 242 manages the execution of software applications (e.g., loading at least one executable of the software application into memory, preparing the executable for execution, and executing the prepared executable). The device manager service 244 manages access to hardware devices through device drivers. The memory manager service 246 manages accesses to the computer system memory 124 and the persistent storage memory 128.

3. PRT Framework a. Introduction

FIG. 16 also shows an embodiment 232 of the PRT framework 12.

The PRT framework 232 includes a PRT API 250, a set of PRT non-kern services, and a PRT kernel 252 that includes a set of PRT kernel services. The PRT API 250 expos all the services provided by the PRT framework 232. The PRT non-kernel services include a connection object manager service 253 an area connect service 254 an area entry service 255, a target connect service 256, and an export presence service 260. In the process of carrying out their respective functionalities, the PRT non -kernel services 254-260 are able to invoke the services of the PRT kernel 252 and the operating system 230 as needed. The PRT kernel services include a logon manager service 262, a session manager service 264, a stream switching service 266, stream handler services 268, a realtime scheduler service 270, a visualization engine service 272, and a bandwidth monitor service 274. In performing their respective functions, the PRT kernel services 262-274 also are able to invoke the services of the operating system 250. Implementations of at least some of the services 254-274 involve integrating traditional operating system functions (e.g., process management functions, file management functions, memory management functions, storage management function, device management functions, and network management functions) with realtime functions (e.g., realtime scheduling functions, realtime connection functions, and realtime data stream handling functions) that are provided by the kernel. In this way, realtime primitives and traditional operating system primitives are exposed to software application developers in a peer relationship.

b. PRT Kernel Services

Each time the PRT framework 232 is launched (typically when the computer system 200 starts), the log-on manager service 262 implements processes for logging into the network infrastructure service environment 43. In some embodiments, the log-on manager service 262 performs the functions of logging into the network infrastructure service environment. 43 through the security service 44, as described above in connection with FIG. 1. The logon manager service 262 also typically handles signing out of the network infrastructure service environment 43.

The session manager service 264 manages sessions between the computer system 120 and target ones of the other network nodes. In response to an invocation of the session manager service 264 (either through an inter-process communication mechanism or a system call), the session manager service 264 negotiates a link with the target network node. In this process, the session manager service 264 typically authenticates the user to the target network node (e.g., based on the security token received from the security service 44), negotiates a stream transport protocol, and negotiates a stream encryption mechanism. The transmission of messages between the session manager service 264 and the target network node may be performed in accordance with a variety of different messaging paradigms. In some embodiments, messages are exchanged asynchronously in accordance with a publish/subscribe model in which messages are segmented into classes, subscribers express interest in one or more message classes, and publishers only transmit messages corresponding to the subscribed classes. In some embodiments, the session manager service 264 also may provide connection recovery mechanisms for re-establishing connections that terminate improperly.

The stream switching service 266 manages the switching of network connections in accordance with the switching rules that are defined by a virtual area. The stream switching service 266 handles the entry into and exit out of a virtual area by avatars and any other objects that are associated with the computer system 200. The stream switching service 266 also automatically determines how to switch (e.g., route, connect and disconnect) realtime data streams between the computer system 200 and the other network nodes 38, 202, 142. The stream switching service 266 makes these determinations based on the switching rules contained in the virtual area specification, the current locations of the avatars and other objects in the virtual area, and the realtime data stream types that are associated with the avatars and other objects in the virtual area. In some embodiments, the stream switching service 266 also factors into these determinations upload and download bandwidth constraints of any of the computer system 20 (as determined by the bandwidth monitor service 274) and the other network nodes 138, 202, 142. In addition, the stream switching service 266 re-evaluates the current set of connections either in response to events (e.g., upload or download bandwidth faults, and requests to enter or exit a virtual area), periodically, or both in response to events and periodically, As a result of the re-evaluation of the current connections, the stream switching service 266 may, for example, take any of the following actions: request stream mixes from the network node 202, drop stream mixes from the network node 202, break one or more direct links with one or more of the other network nodes 138, 142, or form one or more direct links with one or more of the other network nodes 138, 142.

The stream handler services 268 include a respective stream handler service for processing each type of realtime data stream (e.g., motion data streams, audio data streams, chat data streams, file transfer data streams, and video data streams) that are transferred between the computer system 200 and other network nodes. The realtime data stream processing typically includes applying transforms on the realtime data stream. In some embodiments, when the realtime data streams are being processed in the context of a shared virtual area, the stream handler services 268 process the realtime data streams in accordance with a stream processing configuration that is defined by the virtual area specification. In some embodiments, one or more of the stream handler services 268 includes a manager that assembles a set of stream processing objects into a directed graph in accordance with the stream processing configuration defined by the virtual area specification.

Some embodiments include a chat stream handler service that provides an interface for outgoing text messages that are received from a local text input device (e.g., a keyboard) of the computer system 200 and an interface for incoming chat streams that are received from the other network nodes 138, 202, 142. The chat stream handler service processes the text messages that are input by the communicant through the text input device into realtime chat streams and passes the realtime chat streams to the device manager service 24, which translates the chat streams into a format that can be transmitted over the network 42 to the other network nodes 138, 202, 142. The chat stream handler service also processes the incoming text streams and passes the processed text streams to the device manager service 244, which translates the text streams into signals that can be rendered on the display monitor 132.

Some embodiments include an audio stream handler service that processes incoming audio signals that are received from the other network nodes 138, 202, 112. The audio stream handler service passes the processed incoming audio signals to the device manager service 244, which translates the audio signals into a format that can be rendered by the speakers 278, 280 in the communicant's headset 282. The audio stream handler service also processes the outgoing audio signals that are generated by the microphone 284 in the headset 282. The audio stream handler service passes the processed outgoing audio signals to the device manager service 244, which translates the audio signals into a format that can be transmitted over the network 42 to the other network nodes 138, 202, 142.

Some embodiments include a video stream handler service that processes incoming video signals that are received from the other network nodes 138, 202, 142. The video stream handler service passes the processed incoming video signals to the device manager service 241, which translates the video signals into a format that can be rendered by the display 132 and the speakers 278, 280 in the communicant's headset 282. The video stream handler service also processes the outgoing video signals that are generated by, for example, a local camera attached to the computer system 200. The video stream handler service passes the processed outgoing video signals to the device manager service 244, which translates the video signals into a format that can be transmitted over the network 42 to the other network nodes 138, 202, 142.

Some embodiments include a motion data stream handler service that processes incoming motion data signals that are received from the other network nodes 138, 202, 142. The motion data stream handler service passes the processed incoming motion data signals to the visualization engine service 272. The visualization engine service 272 utilizes the motion data signals to update the presentation of a shared virtual area communication session on the display 132. The motion data stream handler service also processes the outgoing motion data signals that are generated by the user input devices. The motion data stream handler service passes the processed outgoing motion data signals to the device manager service 244, which translates the motion data signals into a format that can be transmitted over the network 42 to the other network nodes 138, 202, 142.

Some embodiments include a file transfer stream handler service that processes file signals that are received from the other network nodes 138, 202, 142. The file transfer stream handler service passes the processed file signals to the memory manager service 246, which translates the file signals into a format that can be stored in a persistent storage memory 128. The file stream handler service also invokes the memory manager service 246 to retrieve a computer data file from the persistent storage memory 128, processes the computer data file into a file signal stream, and passes the processed file signal to the device manager service 244, which translates the file signals into a format that can be transmitted over the network 42 to the other network nodes 138, 202, 142.

The visualization engine service 272 presents on the display monitor 132 a view of the virtual area and any objects that are in the virtual area. In this process, the visualization engine service 272 reads the virtual area specification data 224, the objects register 220, and the current object positions database 216. In some embodiments, the visualization engine service 272 also reads a communicant avatar database 248 that contains images needed for rendering the communicant's avatar in the virtual area. Based on this information, the visualization engine service: 272 generates a one-, two- or three-dimensional representation (i.e., an image) of the virtual area and the objects in the virtual area from the point of view (position and orientation) of the communicant's avatar in the virtual area. The visualization engine service 272 then passes the representation of the virtual area to the device manager service 244 of the operating system 230, which controls the rendering of the images of the virtual area on the display monitor 132. In some embodiments, the visualization engine service 272 determines the visibility of the communicant's avatar in order to limit the amount of data that has to he exchanged, processed and rendered to the portion of the virtual area that is visible on the display monitor 132.

The user can control the presented view of the virtual area or the position of the avatar in the virtual area by transmitting commands to the user interface service 240 of the operating system 230 from an input device (e.g., the computer mouse 218). The visualization engine service 272 updates the view of the virtual area and the positions of the objects in the virtual area in accordance with updated positions in the current object positions database 216 and re-renders an updated version of the graphic representation of the virtual area for rendering on the display monitor 132, the visualization engine service 272 may update the rendered image periodically or only in response to movement of one or more of the objects in the virtual area.

The realtime scheduler service 270 manages the scheduling of tasks that are performed by the other PRT kernel services (e.g., the stream handler services) in an effort to achieve realtime performance. For example, in some embodiments the realtime scheduler service 270 schedules tasks based at least in part on a comparison between processing performance and a performance target. In some embodiments, the realtime scheduler service 270 is implemented by a kernel mode or driver process that manages the execution of PRT framework tasks. In some embodiments. The realtime scheduler service 270 additionally manages the execution of operating system tasks (e.g., scheduling and memory management) and synchronization primitives (e.g., semaphores and signal and message passing mechanisms) in a way that provides deterministic execution and blocking times.

In some embodiments, the realtime scheduler service 270 multiplexes the resources of the computer system 200 among one or more executing software applications based on their respective resource requirements in accordance with a priority based or proportional sharing based scheduling model. In these embodiments, each resource typically is associated with a respective scheduler that controls the order in which tasks access the resource. Exemplary schedulers of this type include a processor scheduler that multiplexes access to the one or more processors in the processing unit 122, a memory scheduler that multiplexes the bandwidth of the persistent storage memory 128, and a network scheduler that multiplexes the link bandwidth of the network adapter 138, global scheduler typically sets the policies of the individual schedulers.

In some embodiments, the realtime scheduler service 270 is implemented by a best-effort realtime scheduling process that tries its best to meet realtime software application deadlines but does not guarantee that the realtime software applications will meet these deadlines. In some of these embodiments, the realtime scheduler service 270 operates as a user-mode process that obtains a high-priority thread and attempts to guarantee a specified processing rate (e.g., a target frame rate) by one or more of the stream handler services 268. In some of these embodiments, the realtime scheduler service 270 monitors the performance of at least one processing task performed by one of the stream handler services 268 and schedules that processing tasks based at least in part on the measured performance in relation to a fixed or adaptive performance target. For example, the realtime scheduler service 270 may adaptively modify the configuration of the monitored stream handler service in order to meet a target frame rate of data delivered to a device driver (e.g., an audio driver).

c. PRT Non-Kernel Services

In the illustrative embodiment shown in FIG. 16, the non-kernel services of the PRT framework 232 include the connection object manager service 253, the area connect service 254, the area entry service 255, the target connect service 256, and the export presence service 260. The connection object manager service 253 provides functions for managing connection objects and instantiating connection objects in response to PRT API calls. The area connect service 254 provides functions for connecting to a virtual area. The area entry service 255 provides functions for entering a virtual area. The target connect service 256 provides functions for connecting to a connection target. The export presence service 260 provides functions for exporting presence information to other network nodes. Each of the PRT non-kernel services typically can be invoked by calls from any of software applications, other PRT framework services, and operating system services.

The functions that are provided by the non-kernel services of the PRT framework 232 are described in the following sections.

i. Managing Connection Objects

The connection object manager service 253 provides functions for managing connection objects, including adding connection objects, modifying connection objects, and deleting connection objects. In this regard, the connection object manager service 253 responds to some connection object management related software application calls to the PRT API 250 by invoking the user interface service 240 of the operating system 230 to create dialog boxes and the like that allow a user (e.g., a communicant or a local system administrator) to add, modify, and delete connection objects and their respective associations with computer data file, ware applications.

In some embodiments, a software application may include tools that allow a user to manage connection objects that are associated with sections of a computer data file (e.g., document file produced by a desktop publishing software application) or a software application. These tools may include a command for associating a new connection object instance with the computer data file or the software application, a command for modifying a connection object instance that associated with the computer data file or the software application, and a command for deleting a connection object instance that is associated with the computer data file or the software application.

In response to selection of the command associate a new connection object instance with a section of the computer data file or the software application (e.g., the section that corresponds to the current focus of attention of the user), the software application makes a call to the PRT API 250 that invokes the connection object manager service 253. The connection object manager service 253 instantiates a new connection object instance and associates it with the designated section of the computer data file or the software application by creating in the connection object association database a record that is indexed by an identifier of the designed section and an identifier of the computer data file or the software application. The connection object may be an instance of a default connection object that is associated with the calling software application or the computer data file or it may be a specific connection object that is designated in the PRT API call. After instantiating the new connection object instance, the connection object manager service 253 invokes the user interface service 240 to create a dialog box that allows the user to specify values for the attributes of the connection object instance.

In response to selection of the command to modify a connection object instance that is associated with a section of the computer data file or the software application (e.g., section that corresponds to the current focus of attention of the user), the software application makes a call to the PRT API 250 that invokes the connection object manager service 253. The connection object manager service 253 queries the connection object association database that associates each section of the computer data file or the software application with at least one respective connection object instance. The query returns a connection object instance identifier. The connection object manager service 253 instantiates the connection object instance corresponding to the connection object identifier. After instantiating the connection object instance, the connection object manager service 253 invokes the user interlace service 240 to create a dialog box that allows the user to add, modify or delete values for the attributes of the connection object instance.

In response to selection of the command to delete a connection object instance that is associated with a section of the computer data file or the software application (e.g., the section that corresponds to the current focus of attention of the user), the software application makes a call to the PRT API 230 that invokes the connection object manager service 253. The connection object manager service 253 queries the connection object association database that associates each section of the computer data file or the software application with at least one respective connection object instance. The query returns a connection object identifier corresponding to a connection object instance that is associated with the section of the computer data file or the software application. The connection object manager service 253 invokes the user interface service 240 to create a dialog box that confirms the user's intention to delete the identified connection object instance.

ii. Handling PRT API Calls for Realtime Connections Based on Position in a Computer Data File or a Software Application The connection object manager service 253 also typically handles the initial PRT API calls from software applications and operating system services (e.g., the program loader service 242 and the file manager service 238) that contain a designated position in a computer data file or a software application. In this process, the connection object manager service 233 queries the connection object association database that associates each section of the computer data file or the software application with at least one respective connection object instance. The query returns a connection object identifier corresponding to a connection object instance that is associated with the position in the computer data file or the software application that is designated in the PRT API call. The connection object manager service 253 instantiates the connection object instance corresponding to the connection object identifier. After instantiating the connection object instance, the connection object manager service 253 invokes one or more of the other PRT services that establishes a connection to a virtual area or a connection target in accordance with the attribute values of the instantiated connection object instance.

iii. Connecting to a Virtual Area

Figure 17:
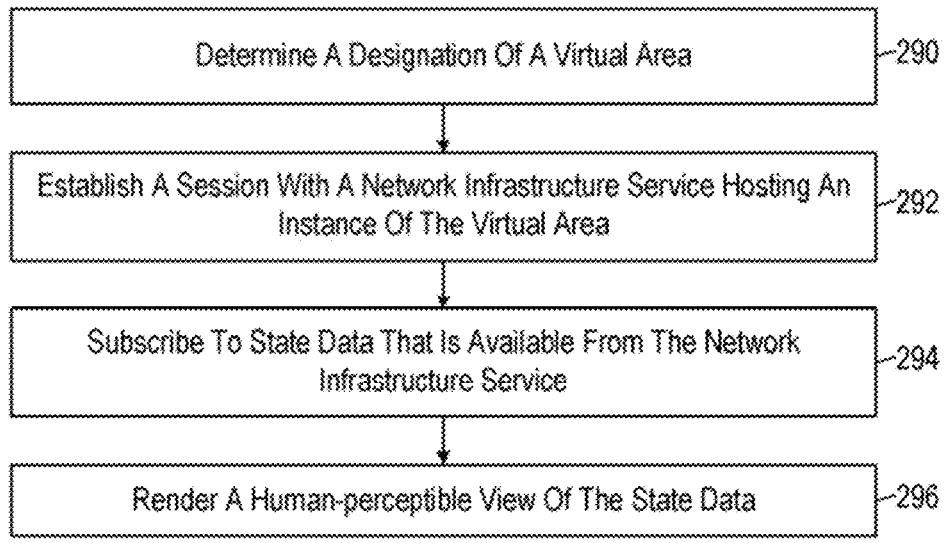
FIG. 17 is a flow diagram of an embodiment of a method that is implemented by an embodiment of an area connect service of the pervasive framework of FIG. 1.

FIG. 17 shows an embodiment of a method that is implemented by the area connect service 254 of the PRT framework 232 in response to a PRT API call requesting a connection to a virtual area.

In accordance with the method of FIG. 17, the area connect service 254 determines a designation of a virtual area (FIG. 17, block 290). In some embodiments, the area connect service 254 is invoked by any of a software application, an operating system service, and a PRT framework service with a PRT API call that includes a virtual area designation. For example, the connection object manager service 253 may invoke the area connect service 254 with a PRT API call that includes a virtual area designation that the connection object manager service 253 extracted from an instance of a connection object that is associated with a computer data file or a software application.

The area connect service 254 establishes a session with a network infrastructure service that hosts the designated virtual area (FIG. 17, block 292). In this process, the area connect service 254 invokes the session manager service 264 to establish a session with the area service 46 in the manner described above. The area connect service 254 then transmits to the area service 40 a request to connect to the designated virtual area. The area service 46 determines an instance of the virtual area that is designated in the request received from the area connect service 254. As explained above, this process typically depends on the way in which the virtual area is designated (e.g., by schema identifier, virtual area instance identifier, or by one or more query attributes). After determining the instance of the virtual area instance, the area service 46 determines if the user's capabilities satisfy the capability requirements associated with the virtual area instance. If the user's capabilities meet the capability requirements, the area service 46 transmits a message indicating the availability of state data that describes a current state of the virtual area instance (e.g., a list of the objects currently in the virtual area instance, along with the names of communicants associated with those objects).

The area connect service 254 subscribes to state data (FIG. 17, block 294). In response to the subscription request, the area service publishes the state data to a channel on the link between the session manager service 264 and the area service 46.

The area connect service 254 invokes the user interface service 240 of the operating system 230 to render a human-perceptible view of the state data (FIG. 17, block 296). For example, the area connect service 254 may invoke the interface service 240 to render a representation of each of the communicants associated with objects currently in the area on the display 132. In some embodiments, the communicants may be represented by an icon, thumbnail image, or other graphic that optionally is labeled with the communicant's name. In some embodiments, the state data is presented in a graphical interlace of a software application that triggered the invocation of the area connect service 254. In some embodiments, the state data is presented in an embodiment of the heads-up display (HUD) interface that is described in U.S. Patent Application No. 61/042714, filed Apr. 4, 2008.

iv. Entering a Virtual Area

After a connection has been established with a virtual area instance, the software application that triggered the invocation of the area connect service 254 can give the user an option to request entry into the virtual area instance or can automatically request entry into the virtual area instance on behalf of the user.

FIG. 1 shows an embodiment of a method that is implemented by the area entry service 255, the stream switching service 266, and the stream handler services 268 of the PRT framework 232 in response to a PRT API call requesting entry into a virtual area.

Figure 18:
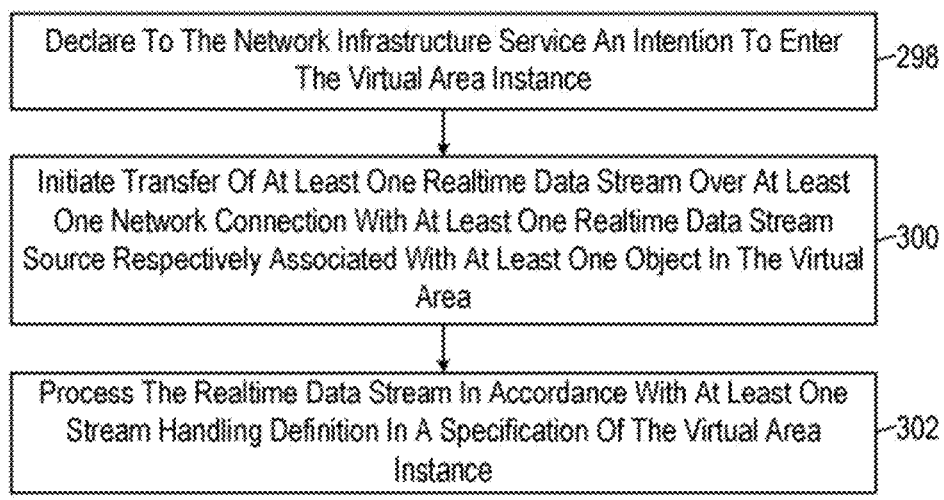
FIG. 18 is a flow diagram of an embodiment of a method that is implemented by embodiments of an area entry service, a stream switching service, and stream handler services in an embodiment of the pervasive framework of FIG. 1.

In accordance with the method of FIG. 18 the area entry service 255 declares an intention to enter the virtual area to the network infrastructure service hosting the virtual area (FIG. 18, block 298). In this process, the area entry service 255 sends a message containing the declaration to the area service 46. The message may be sent on a channel of an existing link with the area service 46 or over a new link that is established with the area service by the session manager 264. In response, the area service 46 determines if the user's capabilities satisfy the capability requirements that are associated with the virtual area instance. If the user's capabilities meet the capability requirements, the area service 46 returns to the area entry service 255 configuration data that includes a definition of the virtual area instance, a register of the objects currently in the virtual area instance, and a set of realtime data stream sources and sinks that are associated with objects in the virtual area in accordance with the specification of the virtual area instance.

The stream switching service 266 initiates transfer of at least one realtime data stream over at least one network connection with at least one realtime data stream source respective associated with at least one object in the virtual area (FIG. 18, block 300). In this process, the stream switching service 266 ascertains one or more network nodes that are associated with the instance of the virtual area based on the configuration data that was received from the area service 46. The stream switching service 266 then initiates transfer of at least one realtime data stream over at least one network connection with at least one of the ascertained network nodes. The connections between the stream switching service 266 and the other network nodes may be peer-to-peer connections or server-mediated connections. With respect to a peer-to-peer connection, the connection target network node and the session manager service 264 typically authenticate one another, and then establish a link over which to transmit the at least one realtime data stream either to or from the connection target. Links typically are one-way and requested by the transmitter and accepted or rejected by the receiver.

In the illustrated embodiment, the stream handler services 268 process the initiated realtime data streams in accordance with at least one stream handling definition in the specification of the virtual area instance (FIG. 18, block 302). In this process, one or more of the stream handler services 268 includes a manager that assembles a set of stream processing objects into a directed graph in accordance with the stream processing configuration that is defined in the virtual area specification.

Figure 19:
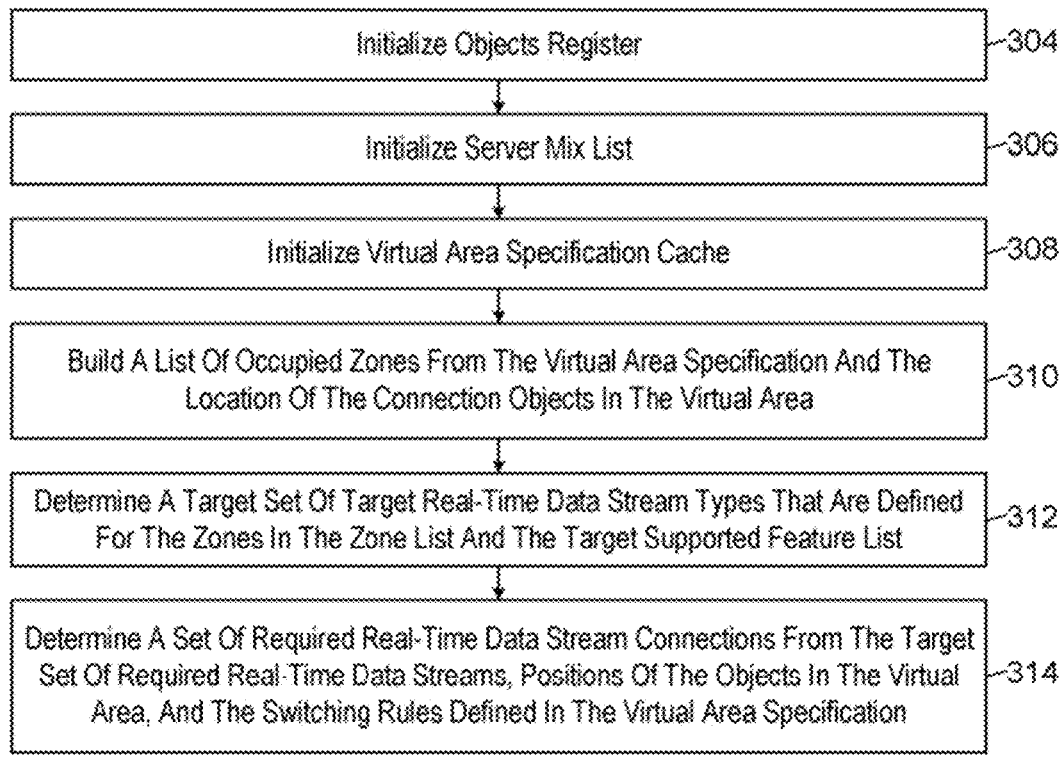
FIG. 19 is a flow diagram of an embodiment of a method that is implemented by an embodiment of a stream switching service in an embodiment of the pervasive framework of FIG. 1.

FIG. 19 shows an embodiment of a method in accordance with which an embodiment of the stream switching service 266 processes the configuration data that is received from the area service 46 in order to determine a set of required realtime data stream connections to make when the user enters a virtual area or crosses a boundary between zones of a virtual area. As explained above, the configuration data includes a copy of the virtual area specification 204 (see FIG. 15) and a copy of the updated objects register 206 (see FIG. 15). In some embodiments, the configuration data additionally includes the stream mix list 208 (see FIG. 15), which identifies the mixes (or combinations) of the realtime data streams generated by the network nodes 138, 142 that currently are being produced by the area service 46.

The stream switching service 266 initializes the local objects register 220 (see FIG. 15) with the copy of the objects register 206 that is received form the area service 46 (FIG. 19, block 304). The stream switching service 266 also initializes the local stream mix list 222 (see FIG. 15) with the copy of the stream mix list 208 that is received from the area service 46 (FIG. 19, block 306). The stream switching service 266 additionally initializes the local virtual area specification cache 224 (see FIG. 15) with the copy of the virtual area specification 204 that is received from the area service 46 (FIG. 19, block 308).

The stream switching service 266 builds a list 214 (see FIG. 15) of occupied zones from the virtual area specification 224 and the location of the user's avatar in the virtual area instance (FIG. 19, block 310). In this process, the stream switching service 266 retrieves the current position of the user's avatar in the virtual area instance from the current object positions database 216, which contains the coordinates of the avatar's current position in the virtual area instance. These coordinates are determined from the realtime motion data stream received from an input device, such as the computer mouse 218. The stream switching service 266 then compares the current position of the user's avatar with the zone definitions in the virtual area specification 224. The stream switching service 266 compiles the occupied zones list 214 from all the zones m the virtual area specification that coincide with the current position of the user's avatar. For example, in some embodiments, the occupied zones list 214 consists of all the zones whose meshes contain the current position of the user's avatar.

The stream switching service 266 determines a set of target realtime data stream types that are defined for the zones in the occupied zones list 214 and the target supported feature list, which accounts for the class of the client (e.g., a voice-only client versus a full-featured client) (FIG. 19, block 312). The stream switching service 266 then determines a set of required realtime data stream data from the set of target realtime data stream types, the positions of the objects in the virtual area instance, and the switching rules defined in the virtual area specification 224 (FIG. 19, block 314). Additional details regarding the process of determining the set of target realtime data stream types and the process of determining the set of required realtime data stream data are described in U.S. application Ser. Nos. 11/923,629 and 11/923,634, both of which were filed on Oct. 24, 2007.

In some exemplary embodiments, after the stream switching service 265 has determined the set of realtime data stream data that enables the user to participate in a collaborative communication session with other network nodes in the shared virtual area instance (FIG. 19, block 314), the stream switching service 266 determines the realtime data stream connections that will result in the delivery of the required data stream data to the computer system 200.

In some of these embodiments, the strew switching service 266 determines a realtime data stream handling topology that delivers the set of realtime data streams to the computer system 200 based at least in part on bandwidth capabilities of the computer system 200. In this process, the stream switching service 266 determines a respective form in which to receive each of the realtime data streams from an unmixed realtime data stream and a stream mix derived from a combination) of realtime data streams. The stream switching service 266 also determines a network route over which each of the realtime streams is received from a direct peer-to-peer network route and a network route mediated by one or more of the other network nodes. After the stream handling topology has been determined, the stream switching service 266 establishes realtime data stream connections between the computer system 200 and other ones of the network nodes in accordance with the determined stream handling topology.

Figure 20:
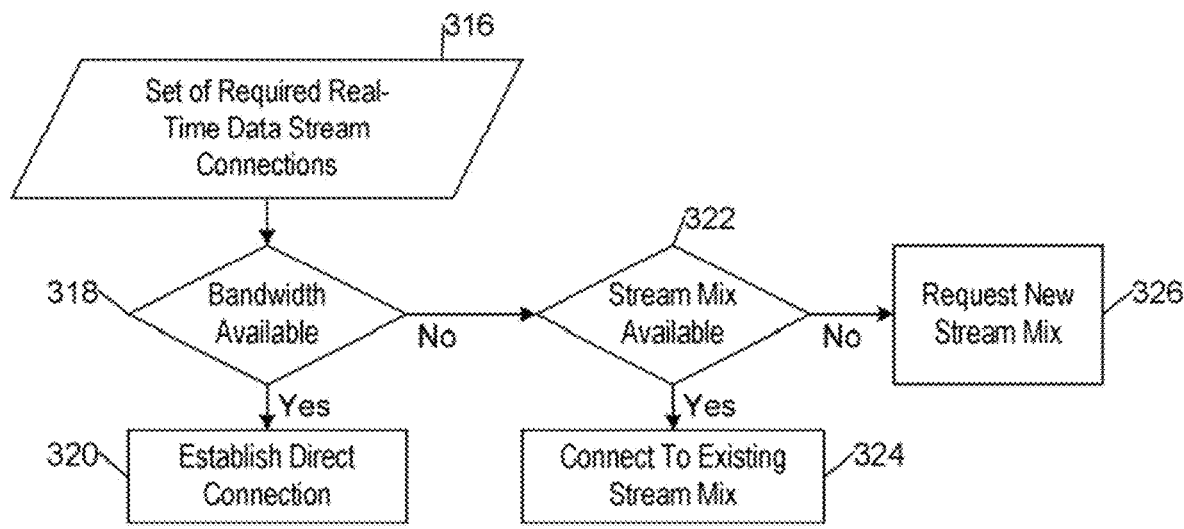
FIG. 20 is a flow diagram of an embodiment of a method that is implemented by an embodiment of a stream switching service in an embodiment of the pervasive framework of FIG. 1.

FIG. 20 shows an embodiment of a method that is implemented by the stream switching service 266 in the process of determining a topology of realtime data stream connections that deliver the required data stream data to the computer system 200.

In accordance with this method the stream switching service 266 determines if the computer system 200 has sufficient bandwidth to receive the set of required realtime data stream data 316 directly from the other network nodes (FIG. 20, block 318). In this process, the other network nodes transmit link requests to the computer system 200. The link requests indicate the respective bandwidth requirements for transmitting the respective sets of realtime data streams needed by the computer system 200. The stream switching service 266 compares the overall bandwidth that is needed to establish the required direct connections with the download bandwidth that is available currently to the computer system 200 as reported by the bandwidth monitor service 274 (see FIG. 16).

If the available bandwidth is at least equal to the overall required bandwidth, the stream switching service 266 establishes direct connections with the other network nodes that provide the required realtime data stream data (FIG. 20, block 320). In this process, the session manager service 264, creates sockets (e.g., TCP sockets or specialized realtime sockets optimized for performance) between the computer system 200 and one or more of the other network nodes 138, 202, 142. The sockets that are created typically include for each realtime data stream type one socket that carries the realtime data stream and one socket for carrying control information (e.g., quality of service information) that is associated with transmission and reception of the associated realtime data stream packets. The stream handler services 26 process the realtime data streams, including encrypting them, recording them, and delivering the processed data streams to the visualization engine service 272, the operating system user interface service 240, and the operating system device manager service 244 as needed for rendering into the user interface and transmission over the network 42.

If the available bandwidth is less than the required bandwidth (FIG. 20 block 318), the stream switching service 266 checks the stream mix list 222 (see FIG. 15) to determine if a stream mix that provides the required realtime data stream data currently is being generated by the area service 46 (FIG. 20, block 322). If the needed stream mix is available, the stream switching service 266 establishes with the area service 46 a connection over which a copy of the needed reaffirm data stream mix is transmitted from the area server 46 to the computer system 200 (FIG. 20, block 324). If the needed stream mix is not available, the stream switching service 266 sends a stream mix request to the area service 46 (FIG. 20, block 326). If possible, the area service 46 generates the needed stream mix in response to the stream mix request.

v. Connecting to Connection Targets

Figure 21:
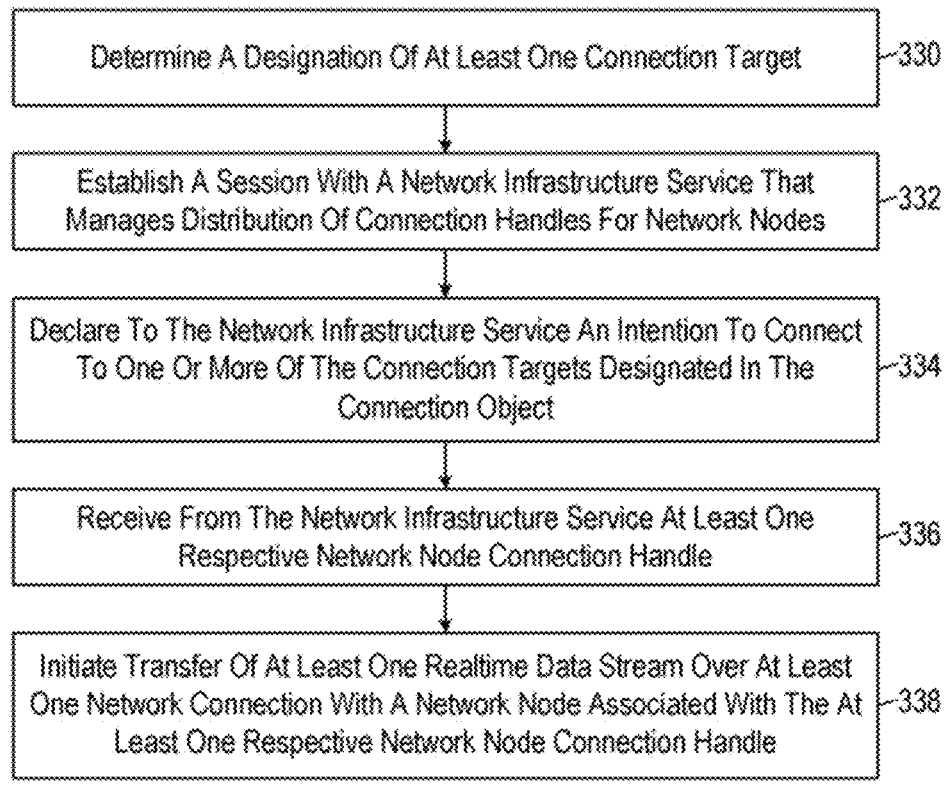
FIG. 21 is a flow diagram of an embodiment of a method that is implemented by an embodiment of a stream switching service in an embodiment of the pervasive framework of FIG. 1.

FIG. 21 shows an embodiment of a method that is implemented by the target connect service 256 of the PRT framework 232 in response to a PRT API call requesting a connection to a connection target.

In accordance with the method of FIG. 2, the target connect service 256 determines a designation of at least one connection target (FIG. 21, block 330). In some embodiments, the target connect service 256 is invoked by any of a software application, an operating system service, and a PRT framework service with a PRT API call that includes a connection target designation. For example, the connection object manager service 253 may invoke the target connect service 256 with a PRT API call that includes a connection target designation that the connection object manager service 253 extracted from an instance of a connection object that is associated with a computer data file or a software application.

The target connect service 256 establishes a session with a network infrastructure service that manages distribution of connection handles for network nodes (FIG. 21, block 332). In this process, the area target connect service 256 invokes the session manager service 264 to establish a session with the rendezvous service 48 in the manner described above.

The target connect service 256 declares to the network infrastructure service an intention to connect to one or more of the connection targets corresponding to the connection target designation (FIG. 21, block 334). The rendezvous service 48 identifies the one or more connection targets that correspond to the connection target designation. If the connection rule designates specific connection targets with target identifiers, the rendezvous service 48 queries the presence database for the states and capability requirements of connection targets corresponding to the designated target identifiers, if the connection rule designates connection targets with a set of one or more attribute values, the rendezvous service 48 queries the presence database for the states and capability requirements that are associated with connection targets having attribute values that match the designated attribute values. The rendezvous service 48 compares the capabilities of the user with the capability requirements that are associated with each of the identified connect targets. The rendezvous service 48 transmits to the connect service 256 the respective connection handle of each of the identified connection targets whose capability requirements are satisfied.

After receiving at least one respective network node connection handle from the network infrastructure, service (FIG. 21, block 336). The target connect service 256 invokes the stream switching service 266 to initiate transfer of at least one realtime data stream over at least one network connection with a network node associated with the at least one respective network node connection handle (FIG. 21, block 338). The connections between the stream switching service 266 and the other network nodes may be peer-to-peer connections or server-mediated connections. With respect to a peer-to-peer connection, the connection target network node and the session manager service 264 typically authenticate one another, and then establish a link over which to transmit the at least one realtime data stream either to or from the connection target. Links typically are one-way and requested by the transmitter and accepted or rejected by the receiver.

vi. Exporting Presence

Figure 22:
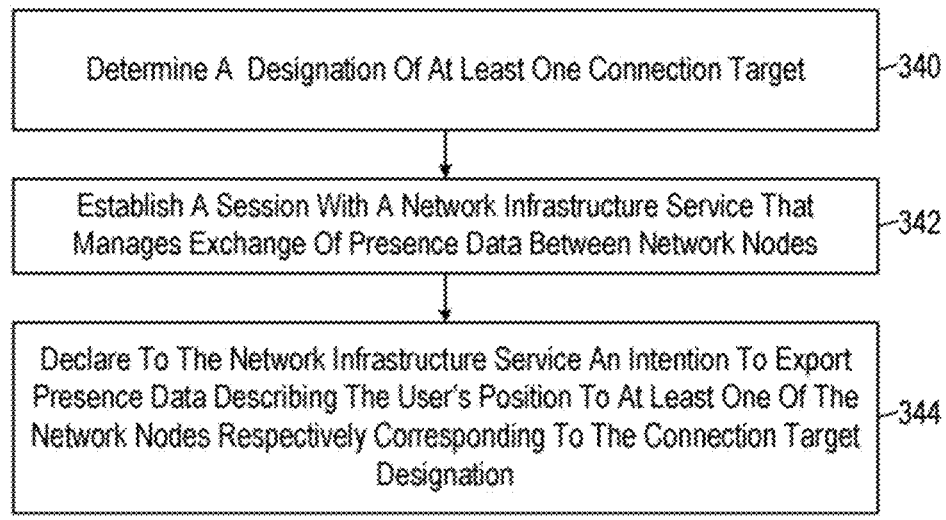
FIG. 22 is a flow diagram of an embodiment of a method that is implemented by an embodiment of a target connect service in an embodiment of the pervasive framework of FIG. 1.

FIG. 22 shows an embodiment of a method that is implemented by the export presence service 260 in response to a PRT API call requesting the exportation of presence information describing the current position of the user in at least, one of a computer data file or a software application to one or more connection targets.

In accordance with the method of FIG. 22, the aport presence service 260 determines a designation of at least one connection target (FIG. 22, block 340). In some embodiments, the export presence service 260 is invoked by any of a software application, an operating system service, and a PRT framework service with a PRT call that includes a connection target designation and a definition of the user's position. For example, the connection object manager service 253 may invoke the export presence service 260 with a PRT API call that includes a connection target designation that the connection object manager service 253 extracted from an instance of a connection object that is associated with a computer data file or a software application.

The export presence service 260 establishes a session with a network infrastructure service that manages the exchange of presence data between network nodes (FIG. 22, block 342). In this process, the export presence service 260 invokes the session manager service 264 to establish a session with the rendezvous service 48 in the mariner described above.

The export presence service 260 declares to the network infrastructure service an intention to export presence data describing the user's position to at least one of the network nodes corresponding to the connection target designation (FIG. 21, block 334). In response to the declaration, the rendezvous service 48 identifies the one or more connection targets that, correspond to the connection target designation. If the connection rule designates specific connection targets with target identifiers, the rendezvous service 48 queries the presence database for the states and capability requirements of the connection targets corresponding to the designated target identifiers. If the connection rule designates connection targets with a set of one or more attribute values, the rendezvous service 48 queries the presence database for the states and capability requirements that are associated with connection targets having attribute values that match the designated attribute values. The rendezvous service 48 compares the capabilities of the user with the capability requirements that are associated with each of the identified connect targets. The rendezvous service 48 transmits the user's presence data to each of the identified connection targets whose capability requirements are satisfied.

d. Invoking PRT Framework Functions

The functions of the PRT framework 232 are invoked by calls to the PRT API 250. These calls may be generated in a variety of different ways. In the illustrated embodiments, calls to the PRT API 250 may be made by any of a software application executing on the computer system 200 or a remote network node, an operating system service executing on the computer system 200 or a remote network node, and a network infrastructure service.

In some embodiments, a software application developer designs a software application to invoke the PRT RPI 250 to establish a realtime application environment for running the software application. In this regard, the software application may be designed to invoke the PRI API 250 at one or more specific positions in the application (e.g., at startup or when a particular function of the software application is invoked) or each time a boundary between sections of the software application is crossed by the user. In these embodiments, the software application typically invokes the PRT API 250 with a call that includes a definition of a current section in at least one of the software application and a computer data file being processed by the software application.

In some of these embodiments, a software application is configured to invoke the PRI RPI 250 with a call that establishes a network connection with at least one connection target. For example, the software application may call the connection object manager service 253 with a designated position in a computer data file or a software application. The connection object manager service 253 instantiates the connection object instance associated with the position in the computer data file or the software application. The connection object typically includes a respective designation of the virtual area and a respective designation of one or more connection targets that are associated with the virtual area. The software application may present the user with an option to enter the virtual area or connect to one or more of the connection targets. If the user elects to enter the virtual area or connect to the connection targets, the software application invokes the PRT API 250 with a PRT API call that initiates transfer of at least one realtime data stream with the connection target over the network connection based on position in the virtual area instance. For example, in response to the PRT API call, the connection object manager service 253 invokes one or more of the other PRT services (e.g., the area connect service 254 or the target connect service 256) that establish a connection to a virtual area or a connection target in accordance with the attribute values of the instantiated connection object instance. One or more of the services of the operating system 230 and the PRT framework 232 process the realtime data stream into a format that can be rendered as a human-perceptible output (e.g., a visual image on the display 132 or an audio output through speakers 278, 280).

In some embodiments, the PRT API 250 is invoked in a computer operating system implemented method of invoking the software application or opening the computer data file.

For example, the PRT API 250 can he invoked by the file manager service 240 of the operating system 230 in the process of opening a computer data file. In some embodiments, this process includes identifying the associated software application based on an association of the software application with a filename extension associated with the computer data file, and executing the associated software application to open the computer data file. In some of these embodiments, a PRT-aware file manager service of the operating system manages a file attributes database (e.g., in extended file attributes that can he associated with the computer data file at the file system level of an operating system) that includes a PRT-enabled attribute that indicates whether or not the associated computer data file is configured with PRT features. In response to a request to open the computer data file, the file manager service 238 reads the file attributes database. If the PRT-enabled attribute value indicates that the computer data file is configured with PRT features, the file system manager service invokes the connection object manager service 253 with a call to the PRT API 250 that includes an identifier of the computer data file. In some of these embodiments, the file attributes database additionally includes an optional definition of an initial position in the computer data file, In these embodiments, the file manager service 238 passes the initial position definition to the connection object manager service 253 in the PRT API call. The connection object manager service 253 uses the initial position definition to determine a connection object that is associated with the computer data file.

The PRT API 250 also can be invoked by the program loader service 242 of the operating system 230 in the process of creating an initial operating environment for a software application. In some embodiments, this process includes loading at least one executable of the software application into memory, preparing the executable for execution, and executing the prepared executable. In some of these embodiments, a software application file also may be associated with a PRT-enabled attribute that can he read by the PRT-aware file manger service. In these embodiments a user's request to run the software application triggers the file system manager service to invoke the connection object manager service 253 with a call to the PRT API 250 that includes an identifier of the computer data file and optionally includes an initial position definition. In some embodiments, a software application developer incorporates a PRT-enabled attribute or a reference to a connection object in a header of a software application file (e.g., header or segment that describes how the software application should be loaded into memory by a program loader service of an operating system). In some of these embodiments, the software application header additionally includes an optional definition of an initial position in the software application. In these embodiments, a command line in software application header can instruct the program loader service to invoke the connection object manager service 253 with a call to the PRT API 250 that includes an identifier of the computer data file and optionally includes the initial position definition. If the software application header stores a reference to a connection object that is indexed in a connection object database, a command line in the software application header can instruct the program loader service to invoke the connection object manager service 253 with a call that contains the connection object reference.

V. Exemplary Applications

The pervasive realtime framework 12 supports the development of a wide variety of realtime software applications that can leverage a new operating environment paradigm in which realtime connections between network nodes are pervasive.

In a first embodiment, a personal information manager software application (e.g., the Microsoft® Outlook® software application) is designed (either originally or through a plugin module or macro) to leverage the functionality provided by the PRT framework 12. In this embodiment, the personal information manager software application includes an electronic mail task, a calendar task, and contact management task. Each of these tasks is defined as a separate section and is associated with a respective connection object. The section corresponding to the electronic mail task, for example, may be associated with a connection object that specifies that when reading an electronic message sent to or sent from any of the contacts in a designated work group, the PRT framework 12 should connect to a specified virtual area associated with the work group and export presence information to ones the contacts in the work group who are not currently in the virtual area.

In the first embodiment, when the user's focus of attention is on an electronic mail message in the electronic mail task, the personal information manager software application invokes the connection object manager service 253 with a PRT API call that includes a definition of position that corresponds to the electronic mail task and a list of the sender and the recipients of the electronic mail message. The connection object manager service 253 retrieves the connection object associated with the electronic mail function based on the position definition. The connection object manager service 253 invokes the area connect service 254, which attempts to connect to the virtual area designated in the connection object subject to the user's preferences and the capability requirements of the virtual area. The connection object manager service 253 also invokes the target connect service 256, which attempts to export presence information to ones the contacts in the work group who currently are not in the virtual area subject to the user's preferences and the capability requirements of the virtual area. In this way, the electronic mail task of the personal information manager software application can leverage the functions of the PRT framework 12 in order to provide users with realtime connections with relevant contacts based on the user's focus of attention in the electronic mail task. The other tasks of the personal information manager software application also ran be designed to leverage the functionality of the PRT framework 12.

In a second embodiment, a web browser software application (e.g., the Microsoft® Internet Explorer® software application, the Firefox® software application, and the Safari® software application) is designed (either originally or through a plugin module or macro) to leverage the functionality provided by the PRT framework 12. In this embodiment, the web browser software application includes a tabbed document interface that allows a user to switch between different web pages without having to switch top level windows. One or more web pages (e.g., a default home web page and a customer service web page) are associated with respective connection objects. The section corresponding to the home web page, for example, may be associated with a connection object that specifies that when viewing the home web page in a tab of the web browser software application, the PRT framework 12 should connect to a specified virtual area associated with the user (e.g., the user's personal virtual area or a virtual area associated with the user's work group). The section corresponding to the customer service web page may be associated with a connection object that specifies that when viewing the customer service web page in a tab of the web browser software application, the PRT framework 12 should connect to a specified customer service virtual area and automatically connect to any communicants in the customer service virtual area who have a role attribute value corresponding to a customer service representative.

In the second embodiment, when the user's focus of attention is on a tab presenting the default home web page, the web browser software application invokes the connection object manager service 253 with a PRT API call that includes a definition of position that corresponds to the default home page document. The connection object manager service 253 retrieves the connection object associated with the default home page document based on the position definition. The connection object manager service 253 invokes the area connect service 254, which attempts to connect to the virtual area designated in the connection object subject to the user's preferences and the capability requirements of the virtual area.

When the user's focus of attention is on a tab presenting the customer service web page, the web browser software application invokes the connection object manager service 253 with a PRT API call that includes a definition of position that corresponds to the customer service web page document. The connection object manager service 253 retrieves the connection object associated with the default home page document based on the position definition. The connection object manager service 253 invokes the area connect service 254, which attempts to connect to the virtual area designated in the connection object subject to the user's preferences and the capability requirements of the virtual area. If any of the current occupants of the virtual area has a customer service representative role attribute value, the connect service 254 invokes the area entry service 255, which attempts to enter the virtual area subject to the user's preferences and the capability requirements of the virtual area. If the area entry attempt is successful, the stream switching service 266 automatically initiates connections with the network nodes associated with objects (e.g., avatars) in the virtual area.

In a third embodiment, a spreadsheet software application (e.g., the Microsoft® Excel® software application) is designed (either originally or through a plugin module or macro) to leverage the functionality provided by the PRT framework 12. In this embodiment, the spreadsheet software application includes a tabbed worksheet interface that allows a user to switch between different worksheets without having to switch top level windows. One or more worksheets (e.g., a stock analysis worksheet) are associated with respective connection objects. The section corresponding to the stock analysis worksheet, for example, may be associated with a connection object that specifies that when viewing the stock analysis worksheet in a tab of the spreadsheet software application, the PRT framework 12 should connect to a specified virtual area associated with the user (e.g., a virtual area associated with a specific type of financial analysis) and connect to a designated data some connection target (e.g., an online stock quoting service) with a request for particular data or data type (e.g., realtime stock quote information for a set of stocks listed on the stock analysis worksheet).

In the third embodiment, when the user's focus of attention is on a tab presenting the stock analysis worksheet the spreadsheet software application invokes the connection object manager service 253 with a PRT API call that includes a definition of position that corresponds to the stock analysis worksheet. The connection object manager service 253 retrieves the connection object associated with the stock analysis worksheet based on the position definition. The connection object manager service 253 invokes the area connect service 254, which attempts to connect to the virtual area designated in the connection object subject to the user's preferences and the capability requirements of the virtual area. The connection object manager service 253 also invokes the target connect service 256, which attempts to connect to the designated data source and retrieve the requested data or data type. If the connection attempt is successful, the stream handler service 268 may be configured to assemble a directed graph of realtime processing objects to perform transforms on the realtime stock quote information in accordance with a realtime processing specification, which may be provided either by the stock analysis work sheet or by the virtual area.

VI. Conclusion

The embodiments that are described herein provide a pervasive realtime framework that supports the execution of realtime software applications with high-level functions that significantly reduce the effort and time needed to develop realtime software applications in a new operating environment paradigm in which realtime connections between network nodes are pervasive the pervasive realtime framework handles the complex tasks of connecting to communicants, virtual areas, and other network resources as well as switching those connections in response to user inputs and thereby enables software application developers to focus on developing high-level realtime software application functionality.

Other embodiments are within the scope of the claims.

The invention claimed is:

1. A method performed by a computer system, the method comprising:
   transmitting, by the computer system, electronic content to an application being executed on a client network node of a user who is a member of a group, wherein the electronic content is associated with a designation of the group, and a view of the electronic content is rendered by the application;
   conditioned on a determination that a current focus of the user is on the rendered view of the electronic content, automatically by the computer system
      establishing a presence for the user in an instance of a virtual area, and
      exporting an indication of the presence of the user in the instance of the virtual area to an application being executed on a client network node of another member of the group.

2. The method of claim 1, wherein the instance of the virtual area supports realtime chat communications between the client network node of the user and the client network node of the other member of the group.

3. The method of claim 1, further comprising based on the group designation, identifying one or more connection targets corresponding to one or more other members of the group.

4. The method of claim 3, wherein, in response to a determination that the user's current focus corresponds to the electronic content, transmitting to the one or more identified connection targets presence data indicating that the current focus of the user is on the electronic content.

5. The method of claim 1, further comprising establishing a presence in the instance of the virtual area for the other member of the group, and establishing realtime communications between the client network node of the user and a client network node of the other member of the group.

6. The method of claim 5, further comprising transmitting to the other member of the group an invitation to participate in a realtime communication session with the user in the instance of the virtual area.

7. The method of claim 1, wherein the electronic content comprises an electronic mail message addressed to the user.

8. The method of claim 1, wherein the application being executed on the client network node of a user comprises a web browser application.

9. A computer-readable data storage apparatus comprising a memory component storing executable instructions that are operable to be executed by a processor, wherein the memory component comprises:
   executable instructions to transmit electronic content to an application being executed on a client network node of a user who is a member of a group, wherein the electronic content is associated with a designation of the group, and a view of the electronic content is rendered by the application;
   executable instructions to, conditioned on a determination that a current focus of the user is on the rendered view of the electronic content, automatically
      establish a presence for the user in an instance of a virtual area, and
      export an inclination of the presence of the user in the instance of the virtual area to an application being executed on a client network node of another member of the group.

10. The computer-readable data storage apparatus of claim 9, wherein the instance of the virtual area supports realtime chat communications between the client network node of the user and the client network node of the other member of the group.

11. The computer-readable data storage apparatus of claim 9, further comprising executable instructions to, based on the group designation, identify one or more connection targets corresponding to one or more other members of the group.

12. The computer-readable data storage apparatus of claim 11, further comprising executable instructions to, in response to a determination that the user's current focus corresponds to the electronic content, transmit to the one or more identified connection targets presence data indicating that the current focus of the user is on the electronic content.

13. The computer-readable data storage apparatus of claim 9, further comprising executable instructions to establish a presence in the instance of the virtual area for the other member of the group, and establish realtime communications between the client network node of the user and a client network node of the other member of the group.

14. The computer-readable data storage apparatus of claim 9, wherein the electronic content comprises an electronic mail message addressed to the user.

15. A system, comprising:
   a communication interface arranged to transmit electronic content to an application being executed on a client network node of a user who is a member of a group, wherein the electronic content is associated with a designation of the group, and a view of the electronic content is rendered by the application;
   a processor arranged to, conditioned on a determination that a current focus of the user is on the rendered view of the electronic content, automatically establish a presence for the user in an instance of a virtual area, and export an indication of the presence of the user in the instance of the virtual area to an application being executed on a client network node of another member of the group.

16. The system of claim 15, wherein the instance of the virtual area supports realtime chat communications between the client network node of the user and the client network node of the other member of the group.

17. The system of claim 15, wherein the processor is arranged to, based on the group designation, identify one or more connection targets corresponding to one or more other members of the group.

18. The system of claim 17, wherein the communication interface is arranged to, in response to a determination that the user's current focus corresponds to the electronic content, transmit to the one or more identified connection targets presence data indicating that the current focus of the user is on the electronic content.

19. The system of claim 15, wherein the processor is arranged to establish a presence in the instance of the virtual area for the other member of the group, and establish realtime communications between the client network node of the user and a client network node of the other member of the group.

20. The system of claim 15, wherein the communication interface is arranged to transmit to the other member of the group an invitation to participate in a realtime communication session with the user in the instance of the virtual area.

* * * * *